US012597407B2

(12) United States Patent　(10) Patent No.:　US 12,597,407 B2

Beltrame et al.　(45) Date of Patent:　Apr. 7, 2026

(54) SOUND-ABSORBING MATERIAL AND METHOD OF MAKING SUCH A SOUND-ABSORBING MATERIAL

(71) Applicant: O.R.V. MANUFACTURING S.P.A., Carmignano di Brenta (IT)

(72) Inventors: Francesca Beltrame, Carmignano di Brenta (IT); Marina Bastarolo, Carmignano di Brenta (IT); Arianna Alfonsi, Carmignano di Brenta (IT)

(73) Assignee: O.R.V. MANUFACTURING S.P.A., Carmignano di Brenta (IT)

( * ) Notice: Subject to any disclaimer, the term of this patent is extended or adjusted under 35 U.S.C. 154(b) by 196 days.

(21) Appl. No.: 18/364,933

(22) Filed: Aug. 3, 2023

(65) Prior Publication Data

US 2024/0046909 A1　Feb. 8, 2024

(30) Foreign Application Priority Data

Aug. 5, 2022　(IT) ...................... 10 2022 000016836
Mar. 22, 2023　(IT) ...................... 10 2023 000005430

(51) Int. Cl.
*G10K 11/168*　(2006.01)
*B32B 5/02*　(2006.01)
(Continued)

(52) U.S. Cl.
CPC ............ *G10K 11/168* (2013.01); *B32B 5/022* (2013.01); *B32B 5/06* (2013.01); *B32B 5/26* (2013.01);
(Continued)

(58) Field of Classification Search
CPC ......... G10K 11/168; B32B 5/022; B32B 5/06; B32B 5/26; B32B 7/02; B32B 7/12; B32B 37/06; B32B 37/18
See application file for complete search history.

(56) References Cited

U.S. PATENT DOCUMENTS 3,159,236 A * 12/1964　Akerson ................... E04B 1/86
　　　　　　　　　　　　　　　　　　　144/365
6,377,695 B1 * 4/2002　Azima ................... H04R 7/045
　　　　　　　　　　　　　　　　　　　381/152
7,757,811 B2　7/2010　Fox
10,789,931 B2　9/2020　Weik
(Continued)

FOREIGN PATENT DOCUMENTS

EP　　　　1501987 B1　2/2005
EP　　　　3246442 B1　11/2017
(Continued)

OTHER PUBLICATIONS

Italian Search Report received for IT Application No. 2022 00016836 on May 11, 2023, 2 pgs.

*Primary Examiner* — Forrest M Phillips
(74) *Attorney, Agent, or Firm* — Merchant & Gould P.C.

(57) ABSTRACT

Sound-absorbing material includes a monolithic main layer which is made of non-woven fiber fabric and has two opposite faces delimiting the thickness of the monolithic main layer. The monolithic main layer has a density gradient in the direction of its thickness. The monolithic main layer has a gradient in the fiber count in the direction of its thickness which decreases, passing from a first face to a second face of the monolithic main layer. The density gradient has an inverse trend with respect to the gradient in fiber count.

31 Claims, 12 Drawing Sheets

(51) Int. Cl.

| | |
|---|---|
| *B32B 5/06* | (2006.01) |
| *B32B 5/26* | (2006.01) |
| *B32B 7/02* | (2019.01) |
| *B32B 7/12* | (2006.01) |
| *B32B 37/06* | (2006.01) |
| *B32B 37/18* | (2006.01) |

(52) U.S. Cl.
CPC .................. *B32B 7/02* (2013.01); *B32B 7/12* (2013.01); *B32B 37/06* (2013.01); *B32B 37/18* (2013.01); *B32B 2250/05* (2013.01); *B32B 2250/20* (2013.01); *B32B 2260/023* (2013.01); *B32B 2260/046* (2013.01); *B32B 2262/0276* (2013.01); *B32B 2262/16* (2021.05); *B32B 2305/076* (2013.01); *B32B 2307/102* (2013.01); *B32B 2307/302* (2013.01); *B32B 2307/718* (2013.01); *B32B 2307/722* (2013.01); *B32B 2307/724* (2013.01)

(56) References Cited

U.S. PATENT DOCUMENTS

| | | | | |
|---|---|---|---|---|
| 2004/0077247 A1* | 4/2004 | Schmidt | ................... | E04B 1/88 442/361 |
| 2004/0248490 A1* | 12/2004 | Hyuga | ............... | B60R 13/0861 442/327 |
| 2005/0026527 A1 | 2/2005 | Schmidt | | |
| 2006/0013996 A1* | 1/2006 | Koyama | ................... | B32B 5/08 442/381 |
| 2014/0272319 A1* | 9/2014 | Guzman | ................ | B32B 15/20 442/342 |
| 2018/0151167 A1* | 5/2018 | Arvidson | ................ | B32B 27/12 |
| 2019/0366674 A1* | 12/2019 | Delmas | ................... | B32B 5/022 |
| 2021/0170717 A1* | 6/2021 | Heath | ................... | D04H 13/005 |

FOREIGN PATENT DOCUMENTS

| | | |
|---|---|---|
| EP | 3937164 A1 | 1/2022 |
| JP | 4574262 B2 | 2/2006 |

* cited by examiner

SOUND-ABSORBING MATERIAL AND METHOD OF MAKING SUCH A SOUND-ABSORBING MATERIAL

CROSS-REFERENCE TO RELATED APPLICATIONS

This application claims priority to Italian Application No.: 10 2023 000005430, filed Mar. 22, 2023, which claims priority to Italian Application No.: 10 2022 000016836, filed Aug. 5, 2022, and which applications are incorporated herein by reference. To the extent appropriate, a claim of priority is made to each of the above disclosed applications.

FIELD OF APPLICATION

The present invention pertains to a sound-absorbing material and a method for making such a sound-absorbing material.

Advantageously, the sound-absorbing material according to the present invention combines a high sound-absorbing capacity over the entire spectrum of acoustic frequencies with thermal insulation and resilience properties and is not subject to delamination. The sound-absorbing material according to the present invention is also easy to manufacture.

Advantageously, the sound-absorbing material according to the present invention is particularly suitable for use in the automotive industry. However, applications in other areas, such as construction, may also be envisaged.

PRIOR ART

Sound insulation is a key issue in many industry field, particularly automotive and construction. In fact, noise may reduce the comfort of an environment, leading to negative effects on life and productivity in working environments.

In this context, there is an increasing demand for lightweight materials for sound insulation.

There are mainly three methods to reduce unwanted noise:

change the noise at the origin and the sources emitting such vibrations;

use barrier systems to prevent sound propagation;

dissipate sound energy with the use of sound-absorbing materials.

Particularly challenging is the reduction of noise in the passenger compartment of cars. When a car is in operation, traffic noise from the outside world and the noise generated by the car itself affect driving comfort. For this reason, efforts are being made to exploit the materials inside the car according to sound absorption and insulation.

Many attempts have been made to reduce the noise and vibration generated by the car, but with results in some cases not always satisfactory. For example, in order to eliminate some noises, attempts are made to improve the sound emission system of the motor system; however, this risks affecting consumption limits and efficiency.

High-density barrier materials, such as steel, have the ability to insulate effectively, but because of their stiffness they reflect most of the acoustic waves back into their surroundings. Their use as insulation materials is therefore impractical due to their weight and high cost; this limits their use in both the automotive and construction sectors.

A current trend in the automotive soundproofing market is to eliminate the aforesaid heavy-layer systems and use lightweight fiber- or foam-based padding systems to accomplish sound correction as headliners, door panels, wheel arches, sound-absorbing floor mats, and trunk liners.

Currently, sound-insulating materials for automobiles are mainly made of recycled fiber felt, PU foam material, and fiberglass.

In general, sound absorbers are porous materials where sound is attenuated in the tortuous channels of said material. This feature is, for example, typical of polyurethane foam materials.

It is well known that compared to polyurethane foams, nonwoven fabrics offer many advantages since they may be recycled, and the related manufacturing processes have less environmental impact than the manufacturing process of traditional polyurethane absorbers.

Several studies have shown that nonwoven fabrics may, moreover, absorb sound over a wider range of frequencies than polyurethane foams.

Nonwoven fabrics are also a viable alternative to glass fibers due primarily to their low density, ability to be recycled, greater health safety, and the wide selection of fibers that may range from natural, artificial, or synthetic fibers as well as biodegradable fibers.

There is a growing need for materials that combine superior performance in terms of sound insulation with lightness and workability.

With the development of the automotive industry, the quality of automobiles has reached a new level, and users' requirements for safety and comfort are becoming more stringent. The development of nonwoven materials with high performance that is such to meet the needs for comfort, environmental protection, safety, and aesthetics has therefore become a benchmark in research in this field.

Therefore, nonwoven materials for automobiles must also be lightweight and have good thermal insulation properties promoting a stable and comfortable temperature inside the passenger compartment. A well thermally insulated passenger compartment results in lower energy consumption. In the case of electric cars, this means positively impacting battery life. Therefore, it is of great importance to research and develop nonwoven materials also having excellent thermal insulation properties.

In general, it is known that the sound absorption performance of nonwoven fabrics depends on the composition and structure of the product, as well as its porosity and tortuosity. In particular, the porosity and tortuosity of materials increase the sound absorption coefficient.

The compressive strength, and especially the springback, of a sound-absorbing material may indirectly affect its sound-absorbing capacity if the material undergoes compression during installation, as is typically the case in the automotive industry. In fact, many sound-absorbing materials lose thickness as a result of compression due to packaging or with die-cutting and in situ application.

Deformation after several compression cycles is a percentage that indicates compressive strength capacity.

Resilience is the ability of a material to absorb the energy of a deformation impact (rapid deformation). Nonwoven fabrics absorb energy elastically when subjected to a load or impact and tend to recover their initial shape prior to said impact.

The loss of thickness as a result of compression also results in a reduction in thermal insulation capacity.

Thermal insulation is the capacity of a material to reduce the flow or transfer of heat. Heat transfer through nonwoven fabrics depends on the type of fibers, the density of the material, and the temperature differences to which it is subjected. Obviously, the flow or transfer of heat depends on the thickness of the material itself: thicker materials with the same density are characterized by higher thermal resistance (ratio of thickness to thermal conductivity). Materials such as nonwoven fabrics (NWF) have small spaces that help reduce heat transfer by convection. The presence of several layers in a NWF ensures the presence of numerous air spaces to reduce said heat transfer.

To date, the best acoustic performance is obtained with materials comprising two or more separate layers, wherein each layer is produced independently with specific stiffness and airflow resistance properties. Once manufactured, these independent layers must then be joined together in an assembly operation.

EP 3 246 442 B1 describes a sound-absorbing textile composite composed of two or more layers with fibers of different sizes. The presence of two or more separate layers with different types of fibers serves to increase the acoustic wave absorption capacity in a wider spectrum from low to high frequencies. In particular, the composite comprises: a first layer (open-pore carrier ply) of nonwoven composed of a mixture of higher-count fibers (between 3 dtex and 12 dtex) and lower-count fibers (between 0.5 dtex and 2.5 dtex); and a second layer (microporous flow ply) comprising microfibers with a diameter of less than 10 m. The two layers are produced separately and then bonded together at a later stage, such as by applying adhesive. In particular, in the case wherein the first layer is made with a meltblown technique, the fibers may be laid directly on the first layer.

Also JP4574262B2, US2005/0026527 A1, U.S. Pat. No. 7,757,811 B2 teach how to construct a high-performing sound-absorbing material across low to high frequencies using multiple layers of material, assembled in various ways. In particular, such a multilayer material consists of a fibrous layer having homogeneous features, coupled with a layer of microfibers.

However, the presence of separate and distinct layers involves the risk of delamination of the material during subsequent operations such as molding and die-cutting, since the connection between the different layers is not always continuous and homogeneous.

This issue was addressed by EP 1 501 987 B1. This document describes a padding material with improved sound absorption properties due to a density gradient within the thickness of the material. The density gradient in turn determines a porosity gradient. Such a material comprises a single layer of nonwoven fabric with a heat-processed surface (hot calendering) to form a surface portion with a higher density with respect to the rest of the material. This provides an increase in acoustic performance while avoiding delamination problems present in multilayer materials.

However, this solution has some disadvantages.

The improvement in terms of sound absorption is limited to the range between 100-2500 Hz (from low to medium frequencies); however, there are no substantial effects at high frequencies.

The increase in density due to the hot process closes the structure on the side with higher density, but this also creates a smooth surface that tends to close all the pores.

More specifically, the improvement of acoustic features in EP1501987B1 is achieved through a physical process of compressing and softening the first surface layers that come in contact with the heating or compression system; a kind of calendering process that involves only the reduction of porosity resulting in the closure of the product and consequent reduction of the possibility of acoustic wave penetration.

Moreover, the thermo-compression process causes a physical change in the shape of the fibers, some of which soften and thicken. In this way, any elasticity features due to fiber crimp will be lost with a negative effect on the resilience of the material. In particular, the thickness of the material is reduced, which actively contributes to resilience.

In the field of sound absorbers there is therefore a great need, hitherto substantially unmet, for a sound-absorbing material that has high sound absorption capabilities not only at medium and high wave frequencies but also at low wave frequencies and is basically not subject to delamination phenomena.

Preferably, such sound-absorbing material should also be easy to manufacture.

Furthermore, there is a great need for such sound absorbers to also exhibit good resilience properties.

DISCLOSURE OF THE INVENTION

Therefore, the main object of the present invention is to eliminate all or part of the drawbacks of the above-mentioned prior art by making available a sound-absorbing material that exhibits high sound absorption capacities at low-, medium-, and high-wave frequencies and is substantially not subject to delamination phenomena.

A further object of the present invention is to provide a sound-absorbing material which is simple to manufacture.

A further object of the present invention is to make available a sound-absorbing material that also exhibits high resilience.

A further object of the present invention is to make available a sound-absorbing material that also has high thermal insulation capacities.

BRIEF DESCRIPTION OF THE DRAWINGS

The technical features of the invention, according to the aforesaid objects, may be clearly seen in the contents of the claims below, and its advantages will become more readily apparent in the detailed description that follows, made with reference to the accompanying drawings, which represent one or more purely exemplifying and non-limiting embodiments thereof, wherein:

DETAILED DESCRIPTION

Figure 1:
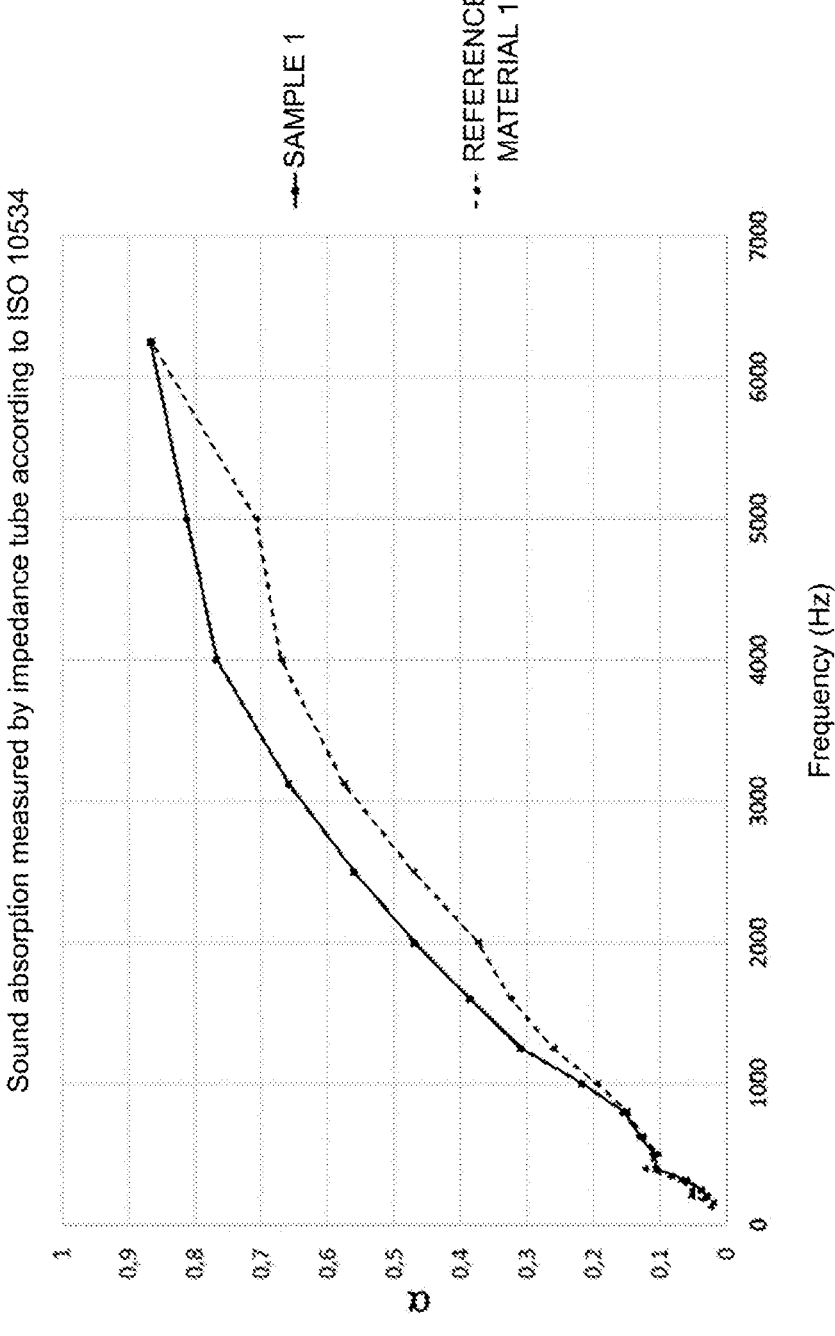
FIGS. 1 to 4 are graphs relating to the sound absorption coefficient versus frequency of some sound-absorbing materials according to the invention and some conventional materials for comparison.

The sound-absorbing material according to the invention has been indicated as a whole with reference numeral 1 in the accompanying figures.

In accordance with a general embodiment of the invention, the sound-absorbing material 1 comprises a monolithic main layer 10 that is made of non-woven fiber fabric and has two opposite faces delimiting the thickness of said monolithic main layer 10.

The nonwoven fabric is a porous material wherein fibers are randomly distributed forming numerous pores and tortuous channels connected to the surface; when acoustic waves penetrate the nonwoven fabric, energy is partly dissipated inside, converting into absorbed heat, thus reducing the transmitted energy.

The monolithic main layer 10 has in the direction Z of its thickness a density gradient.

According to the invention, the monolithic main layer 10 also has, in the direction Z of its thickness, a gradient in the fiber count.

The fiber count is the number representing the ratio of its weight to its length. The count is thus a quantity that defines the degree of fineness and quality of a fiber expressed according to its parameters of weight and length.

According to the invention, this gradient in the fiber count decreases from a first face 10' to a second face 10" of said monolithic main layer 10. Further, the density gradient has an inverse trend with respect to the gradient in fiber count.

In other words, the higher density portions of the monolithic main layer 10 are defined by nonwoven fabric with lower fiber count, while the lower density portions of the monolithic main layer 10 are defined by nonwoven fabric with higher fiber count.

The gradient in the fiber count determines a tortuosity gradient and a porosity gradient in the direction Z.

The porosity gradient has a trend concordant with the gradient of count. In other words, as fiber count decreases, porosity decreases.

In contrast, the tortuosity gradient has an inverse trend with respect to the count gradient. In other words, as fiber count decreases, tortuosity increases.

Porosity is a measure of empty spaces in a material, and is defined as the ratio of the Empty Space Volume of that particular material to the Total Volume of said material. The porosity of a material provides air spaces where the acoustic waves may move and where they are dissipated. A complex porous structure will involve multiple reactions between the acoustic wave and the pore walls. The acoustic wave will be further reflected and dissipated.

Tortuosity also plays a very important role in the processes governing sound propagation in materials; in particular, it describes the complexity of the path of the acoustic wave that propagates within the material. Tortuosity prevents the acoustic wave therefore from propagating in a straight line. Tortuosity is defined as the ratio of the effective path length of the sound wave flow to the length (thickness) of the porous medium in the direction of said flow. Greater tortuosity would thus indicate a longer, more complicated and sinuous path resulting in greater resistance to the flow of the acoustic wave.

Tortuosity mainly affects the high-frequency sound-absorbing behavior of porous materials. Tortuosity improves high-frequency absorption performance for fibrous materials. This is because the more complex the path taken by the acoustic wave in the nonwoven fabric mat, the greater the possibility of abatement of the acoustic wave.

The density gradient also in turn generates a porosity and tortuosity gradient in the Z-axis direction.

The porosity gradient has an inverse trend with the density gradient. In other words, as density decreases, porosity increases.

In contrast, the tortuosity gradient has a concordant trend with respect to the density gradient. In other words, as density decreases, tortuosity decreases.

The density gradient thus cooperates synergistically with the gradient in the fiber count, enhancing its effects on sound absorption capacity. In fact, the porosity and tortuosity gradients related to the count gradient are added to the porosity and tortuosity gradients related to the density gradient.

The lower fiber count and high density portions are thus characterized by high tortuosity and low porosity, while the higher fiber count and low density portions are characterized by low tortuosity and high porosity.

In the monolithic main layer 10 along the direction Z—through the presence of inverse gradients of fiber count and density—there is thus overall a marked tortuosity gradient and a marked porosity gradient having inverse trends. All this gives the monolithic main layer 10 high-efficiency acoustic wave absorption capacity over a wide frequency spectrum.

With respect to sound-absorbing materials without a count gradient and/or density gradient, the sound-absorbing material according to the invention—through the monolithic main layer—thus ensures an acoustic performance characterized by a higher sound absorption coefficient in the 400-5000 Hz range.

Without wishing to commit to a specific theory, the following physical explanation has been hypothesized.

When acoustic waves enter a homogeneous material with a uniform pore structure, part of the acoustic waves are reflected and part are transmitted as they propagate in the uniform pores; only part of the acoustic waves are gradually dissipated by the material, resulting in sound absorption.

Conversely, when acoustic waves enter a sound-absorbing material according to the invention having the aforesaid monolithic main layer 10:

the area of the material having higher-count fibers, due to its higher porosity and lower tortuosity, facilitates a passage and propagation of acoustic waves; concurrently, high-frequency acoustic waves, which are characterized by short wavelength and low penetration energy, gradually dissipate, ensuring good sound absorption at high frequencies;

the area of the material having lower-count fibers, due to lower porosity and higher tortuosity, reduces the transmission of acoustic waves, in particular at low frequency, causing them to dissipate within the material.

In other words, as is clear from the tests illustrated in the comparative examples that will be illustrated later in the description, the sound absorption coefficient of the monolithic main layer 10 of the sound-absorbing material according to the invention is higher than that of conventional homogeneous-type sound-absorbing materials due to the progression of fiber count and thus due to the decrease in porosity and the increase in tortuosity in the direction Z. The inverse trend of the density enhances this phenomenon.

Fiber count and density gradients also determine a differentiation along the direction Z of the mechanical behavior of the monolithic main layer of the sound-absorbing material according to the invention:

the area of the material with a higher fiber count, owing to its higher porosity and lower density, is softer; and the area of the material with lower fiber count, owing to lower porosity and higher density, is more compact.

The soft part imparts to the monolithic main layer 10 the property of being readily compressed, alongside a high springback, i.e., resilience property.

Increased resilience makes it possible to reduce the loss of material thickness due to processing operations on the material and partly due to in situ installation operations.

Maintaining the thickness allows the sound absorption capabilities, as well as thermal insulation, to be maintained as much as possible.

The increased resilience also makes it possible to position the sound-absorbing material according to the invention in specific installation spaces. In fact, the sound-absorbing material is able to fill the installation space very well, being able to occupy even complex geometries and different thicknesses.

The resilience property, and especially the springback, is enhanced in case of heating. In fact, it has been observed that when subjected to heating after compression with thickness reduction, the monolithic main layer 10 is subject to a particularly pronounced elastic recovery phenomenon, which enhances its gap-filling capacity with recovery of at least the initial thickness. This feature makes the sound-absorbing material particularly suitable for automotive applications. The thermal cycles to which motor vehicles are subjected under sun exposure promote settlement of the material at the installation site.

Finally, due to the fact that the main layer 10 is monolithic (i.e., not a multilayer material), it is not substantially subject to delamination phenomena.

Gradients in the fiber count and density may have a continuous progression or have a discontinuous (stepped) progression.

Preferably, the gradients in the fiber count and density have a discontinuous (stepped) progression.

Figure 5:
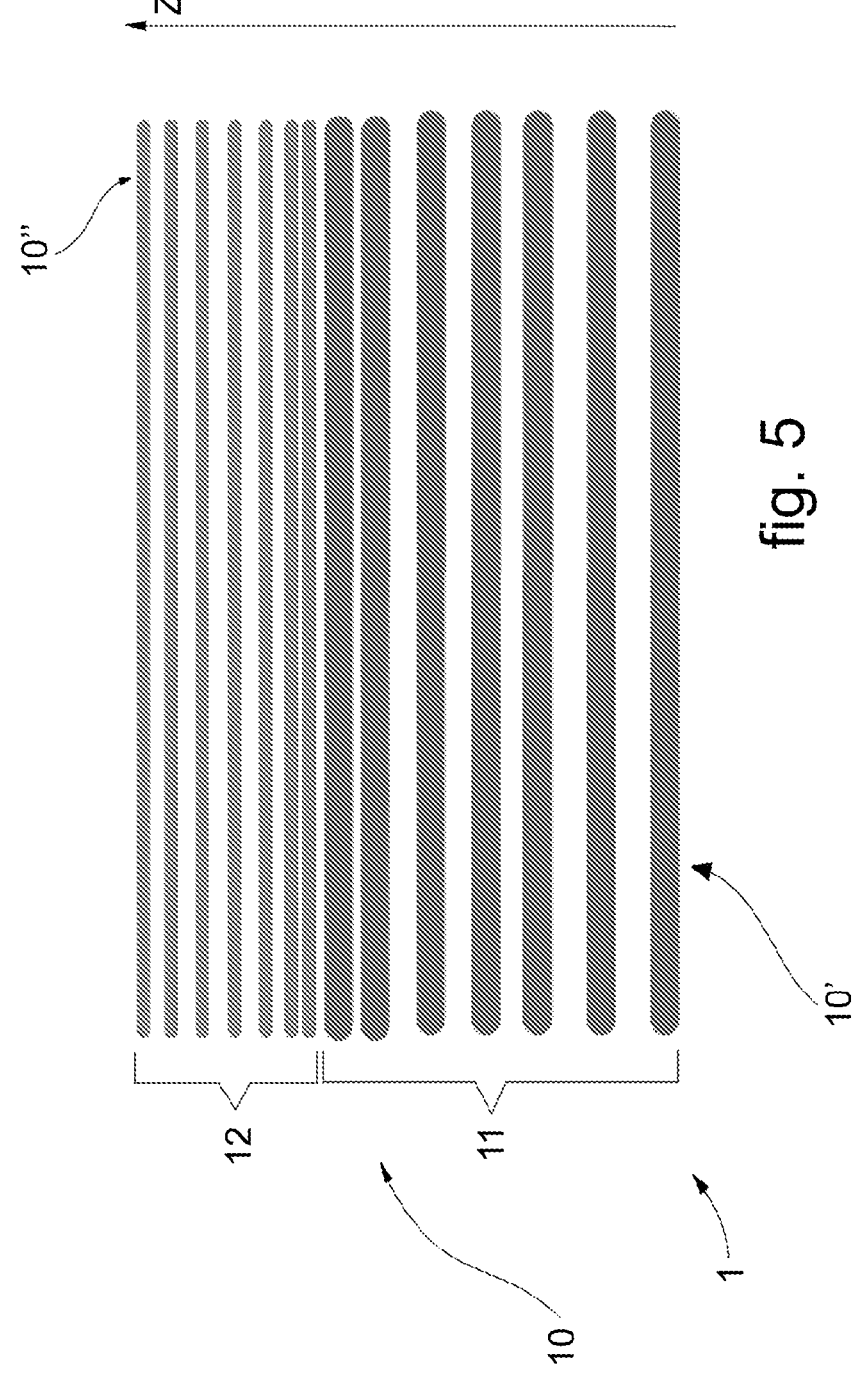
FIG. 5 is a schematic representation of the structure of the monolithic main layer of a sound-absorbing material in accordance with a preferred embodiment of the invention, which involves solidarization of the material only by thermobonding.
Figure 7:
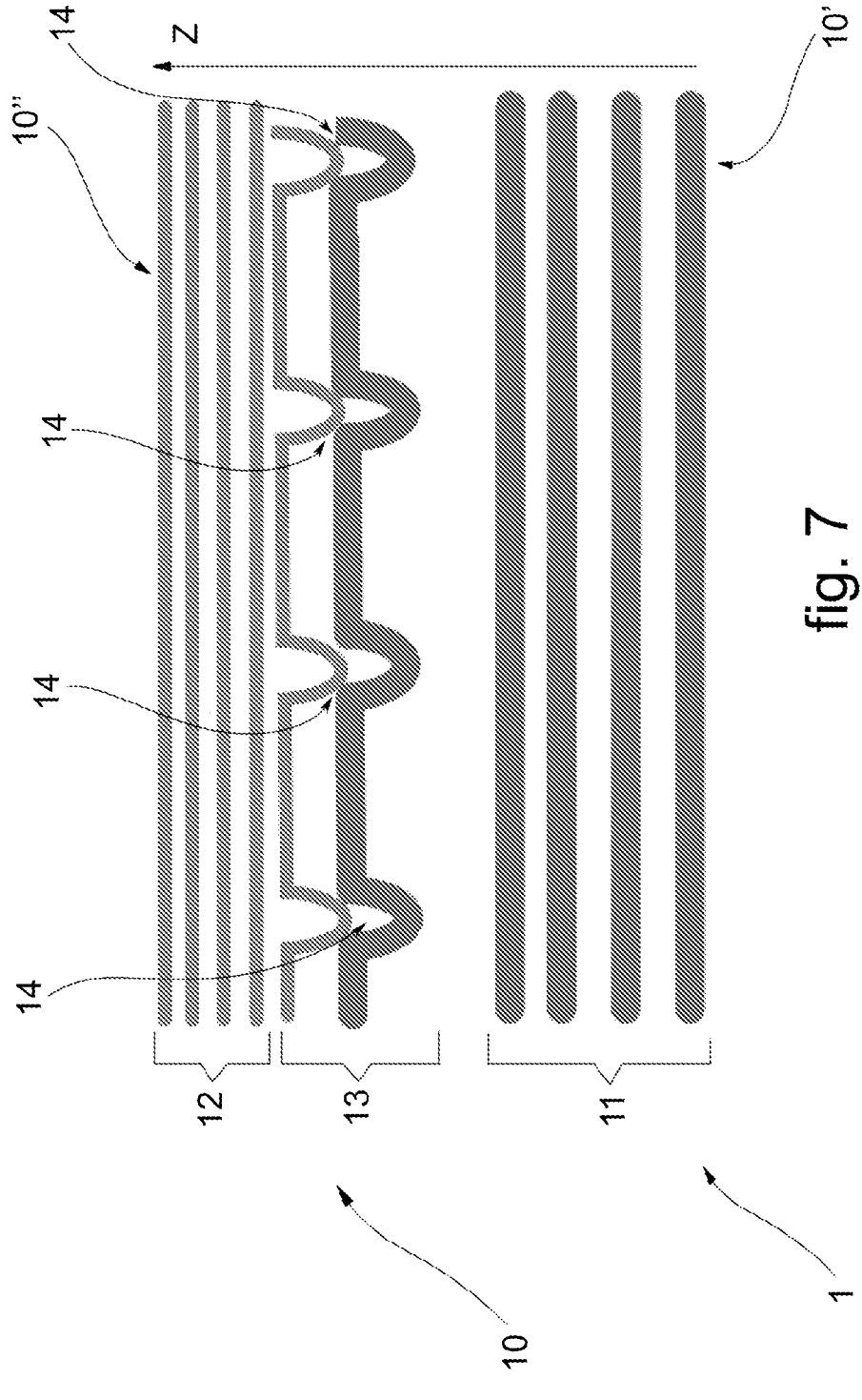
FIG. 7 is a schematic representation of the structure of the monolithic main layer of a sound-absorbing material in accordance with a further preferred embodiment of the invention, which involves the solidarization of the material by needling and thermobonding.

Preferably, as shown in the diagrams in FIGS. 5 and 7, the monolithic main layer 10 comprises at least two portions, each of which has homogeneous features in terms of density and fiber count. In this case, the gradient of density and fiber count between the two portions is not given by a continuous progression of density and count values, but by a discontinuous (stepped) progression.

More specifically, these two portions are defined as follows:

a first portion 11 defining the first face 10' of said monolithic main layer 10 and covering a first fraction of the thickness thereof; this first portion 11 has a first predefined average density ρ1 and contains fibers with a first predefined average count T1; and a second portion 12 defining the second face 10" of said monolithic main layer 10 and covering a second fraction of the thickness; said second portion 12 has a second predefined average density ρ2 greater than said first predefined average density ρ1 and contains fibers with a second predefined average count T2 less than said first predefined average count T1.

In the following, the first portion 11 may also be referred to as the COARSE fiber portion, while the second portion 12 may also be referred to as the FINER fiber portion.

Due to the fact that the count and density gradients have a discontinuous (stepped) progression within the monolithic main layer 10, an interface is created between the two portions with different porosity and fiber count. The acoustic waves passing through the material, when they meet the aforesaid interface, are further reflected by increasing the internal dissipation phenomena in the material. This helps to improve sound absorption.

Figure 6:
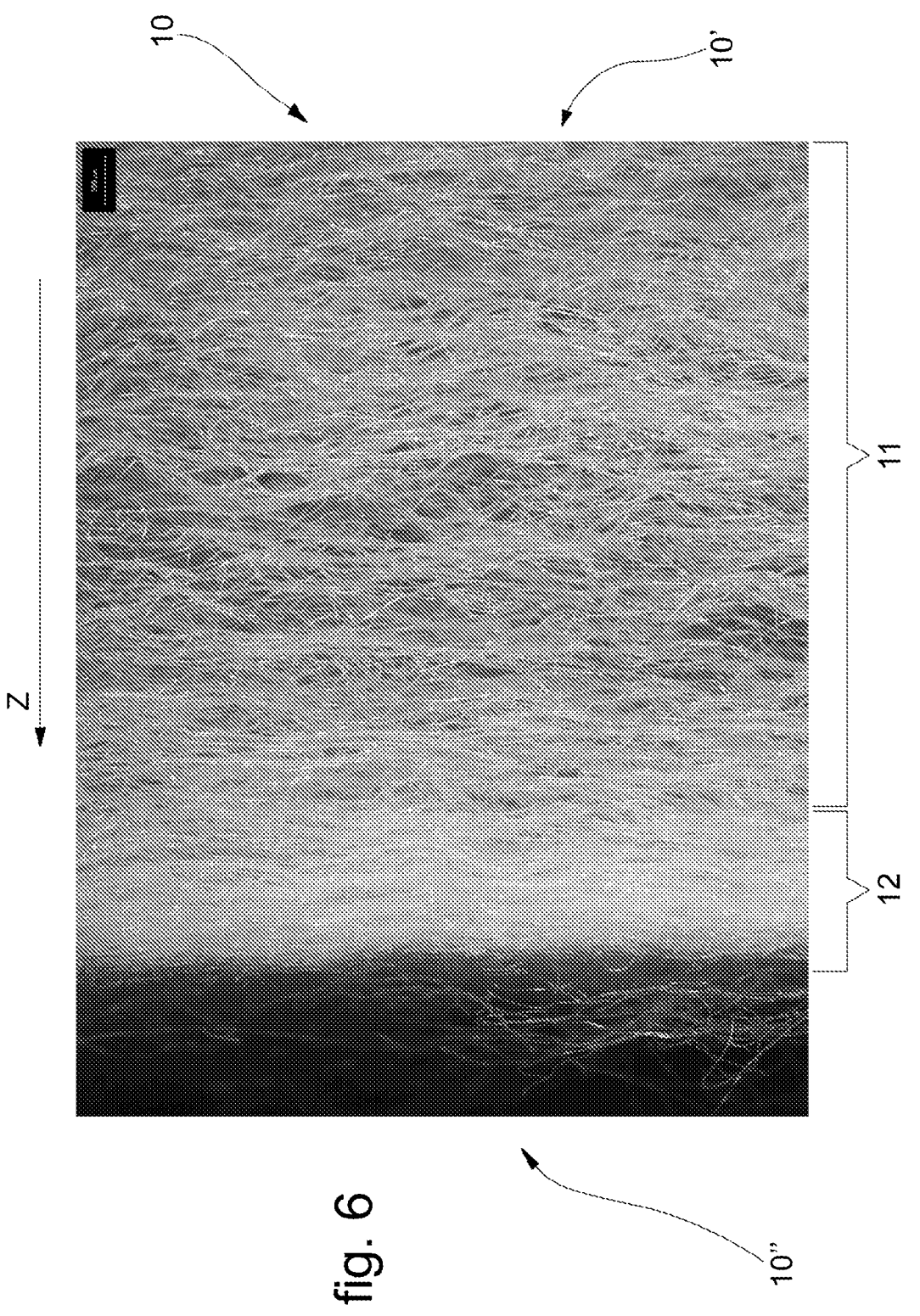
FIG. 6 is a microscopic photograph of the monolithic main layer of a sound-absorbing material corresponding to the diagram in FIG. 5.
Figure 8:
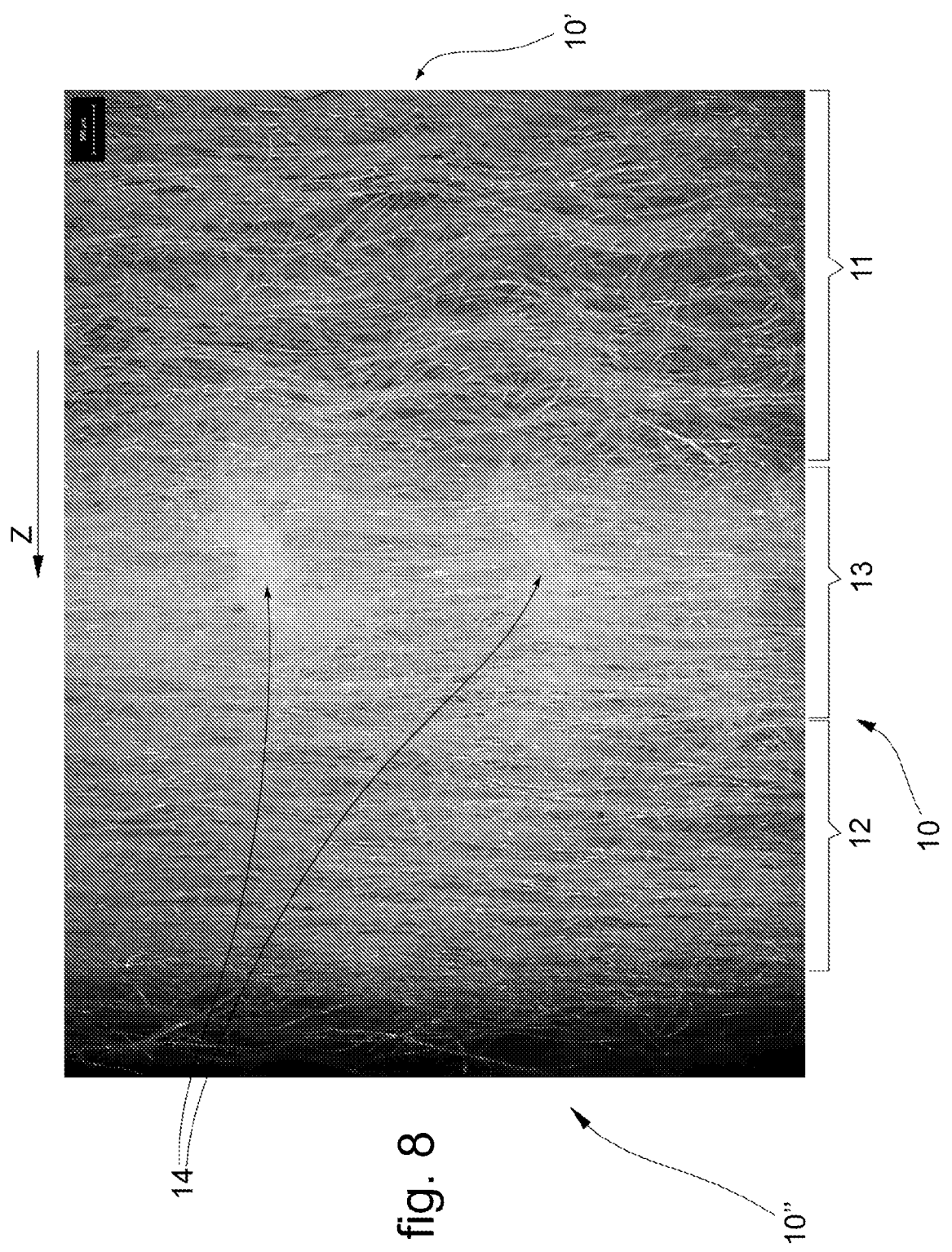
FIG. 8 shows a microscopic photograph of the monolithic main layer of a sound-absorbing material corresponding to the diagram in FIG. 7.

Preferably, as may be seen in the photographs in FIGS. 6 and 8, the first portion 11 of said monolithic main layer (COARSE portion) consists of a first multi-ply structure formed by a mixture of thermoplastic staple fibers and thermobonding staple fibers, while the second portion 12 of said monolithic main layer (FINER portion) consists of a second multi-ply structure formed by a mixture of thermoplastic staple fibers and thermobonding fibers.

"Multi-ply structure" refers to a nonwoven structure formed by the superposition of a plurality of carded plies; such a structure may be obtained by a carding machine and a crosslapper. Operationally, the first multi-ply structure and the second multi-ply structure may be made by a first carding machine and a first crosslapper and by a second carding machine and a second crosslapper, respectively, to be then solidarized with each other—after being overlapped—by at least thermobonding, as will be explained hereinafter.

Preferably, the first portion 11 (coarse) has a basis weight between 60 and 500 g/m2 and a thickness along the direction Z between ⅔ and ¾ of the total thickness of the monolithic main layer 10; the second portion 12 (finer) has a basis weight between 60 and 500 g/m2 and a thickness along the direction Z between ⅓ and ¼ of the total thickness of the monolithic main layer 10. The basis weight and thickness values of the two portions 11, 12 are chosen so that the density value corresponding to the ratio of the basis weight to the thickness of the first portion 11 (coarse) is less than the ratio of the basis weight to the thickness of the second portion 12 (finer).

Preferably, the first average density ρ1 of the first portion 11 (coarse) is between 10 kg/m3 and 30 kg/m3.

Preferably, the first average count T1 of thermoplastic staple fibers of the first portion 11 (coarse) is between 1.5 dtex and 3.3 dtex.

Preferably, the second average density ρ2 of the second portion 12 (finer) is between 20 kg/m3 and 60 kg/m3.

Preferably, the second average count T2 of the thermoplastic staple fibers of the second portion 12 (finer) is between 0.8 dtex and 1.7 dtex.

Preferably, the monolithic main layer 10 as a whole has a basis weight between 120 and 1000 g/m2 and a total thickness along the direction Z between 10 and 40 mm.

The basis weight measurement method is defined by EN ISO 9073 PART 1, while the thickness measurement method is defined by EN ISO 9073 PART 2.

Preferably, the content of thermobonding fibers in the monolithic main layer 10 is no more than 30% by weight. Even more preferably, the content of thermobonding fibers is no more than 25% by weight. These limits on the weight content of thermobonding fibers on the one hand give structure to the material and on the other ensure the mobility of the other fibers that make up the material.

In accordance with a particularly preferred embodiment, the first portion 11 (coarse) consists of:

from 70% to 90% by weight of thermoplastic staple fibers having a count between 1.5 and 1.7 dtex, preferably from 75% to 85% by weight; and from 10% to 30% by weight of thermobonding fibers, preferably from 15% to 25% by weight.

Alternatively, the first portion 11 (coarse) may consist of:

from 40% to 80% by weight of thermoplastic staple fibers having a count between 1.5 and 1.7 dtex, preferably from 50% to 75% by weight; and from 10% to 30% by weight of thermoplastic staple fibers having a count between 2.2 and 3.3 dtex, preferably from 10% to 25% by weight; and from 10% to 30% by weight of thermobonding fibers, preferably from 15% to 25% by weight.

In accordance with the aforesaid particularly preferred embodiment, the second portion 12 (finer) consist of:

from 20% to 45% by weight of thermoplastic staple fibers having a count between 0.8 and 1.1 dtex, preferably from 25% to 40% by weight;

from 25% to 70% by weight of thermoplastic staple fibers having a count between 1.5 and 1.7 dtex, preferably from 35% to 60% by weight; and from 10% to 30% by weight of thermobonding fibers, preferably from 15% to 25% by weight.

Advantageously, the aforesaid thermobonding fibers have counts between 2.2 dtex and 4.4 dtex, preferably 2.2 dtex.

Advantageously, at least part of said thermoplastic staple fibers may be hollow fibers. The hollow fibers provide more surface area with less weight; therefore, they allow for improved sound absorption. The structure of the hollow fibers, which contain air within their lumen, increases the volume of air in the nonwoven fabric and increases its capacity to absorb acoustic waves, without increasing its capacity to reflect them.

Preferably, the aforesaid thermoplastic staple fibers may be crimped fibers, preferably having a degree of crimp of not less than 3 waves/cm. The crimp of the fibers imparts more pronounced resilience properties to the nonwoven fabric made from these fibers.

Advantageously, a three-dimensional crimp of the fibers combined with the presence of hollow fibers allows for superior resilience and increased insulation of the finished product (HCS conjugated polyester fibers); these fibers allow for reduced thickness loss after compression.

Advantageously, at least some of the aforesaid thermoplastic staple fibers may be fibers having special cross-section (cross-shape, octalobed, trilobed, pentalobed). The presence of such fibers increases the total surface area being the volume equal, improving the sound absorption properties with respect to using only standard circular-section fibers.

Advantageously, the aforesaid thermoplastic staple fibers consist of a material selected from the group consisting of: polyesters, polyamides, polyolefins, acrylics, aramidics, PPS, PBI, melamines, vinyls, viscose.

In particular, "polyester fiber" refers to the general name for polyester-based fiber produced by the polycondensation of various diols and aromatic bicarboxylic acids or their esters. The specific varieties of polyester fibers are: poly-ethylene terephthalate fiber, polybutylene terephthalate fiber, polytrimethylene terephthalate fiber, poly-1,4-cyclo-hexane dimethyl terephthalate fiber, poly-2,6-ethylene naph-thalate fiber, and a variety of modified polyethylene tereph-thalate fibers (such as CDP, ECDP, EDDP), polyamide, etc.

Since polyethylene terephthalate fiber is the most widely used, "polyester fiber" usually refers to this fiber.

Advantageously, the aforesaid thermobonding fibers may have different shapes and configurations and in particular the core/sheat configuration, the side-by-side configuration, and the islands-in-the-sea configuration.

Preferably, the aforesaid thermobonding fibers have a core-sheat shape.

In particular, the core-sheat fibers contain at least two polymers with different melting and/or softening points; the component with the highest softening and/or melting tem-perature is normally found on the inner side. The bonding function of said fibers is achieved by partial/total melting of the outer part.

Preferably, the core-sheat type thermobonding fibers have the outer part made of polybutylene terephthalate, poly-amide, polyethylene, copolyamide, and/or copolyesters, while the inner part is made of polyester, especially poly-ethylene terephthalate and/or polyethylene naphthalate and/or polyolefins.

Preferably, said monolithic main layer 10 is obtained by superposition of the multi-ply structures of the two portions 11 and 12 exiting from respective crosslappers and subse-quent single thermobonding treatment that is simultaneously adapted to consolidate the two multi-ply structures and connect them together. This consolidation between the two multi-ply structures further stabilizes the monolithicity of the assembly of the two structures, eliminating delamination phenomena between the two portions of the main layer 10. The assembly of the two portions 11 and 12 is made in the same way as the single portion, i.e., by the superposition of multiple fiber plies. Morphologically, there is thus no dis-tinction between the two portions 11 and 12, except in terms of fiber count and density, confirming that it is a monolithic material, although not homogeneous.

In accordance with a preferred embodiment, illustrated in the diagram in FIG. 5, the first portion 11 (coarse) and the second portion 12 (finer) define the monolithic main layer 10 in its entirety.

More specifically, as may be seen in the photomicrograph in FIG. 6, the two multi-ply structures seamlessly interpen-etrate each other at the transition zone between the portions 11 and 12. In other words, the two portions 11 and 12 are not separated by a clear interface surface. The transition zone between the two portions 11 and 12 is defined by the juxtaposition of two irregular surfaces defined by the multi-ply structures. The combination of the two multilayer struc-tures effectively replicates the overlapping ply arrangement found in the individual multilayer structures.

Operationally, through the process of thermobonding, at least part of the thermobonding fibers of both portions 11 and 12 have been thermally deformed and define connection bridge structures, both internally to both portions and at the interface between the first portion 11 and the second portion 12.

Preferably, following the single-stage thermobonding process, the thermobonding fibers were "activated" in a single thermal step. Thus, the connection bridge structures formed have a substantially homogeneous distribution and morphology in the two portions 11 and 12 and at the transition zone between the two portions. In this way, there is an interpenetration between sections 11 and 12, unlike the case of a material wherein the thermobonding is done in two steps (separate thermobonding of the two portions aimed at consolidating them, then thermobonding to join the two already thermobonded portions). One-step thermobonding reduces the delamination phenomena.

Figure 9:
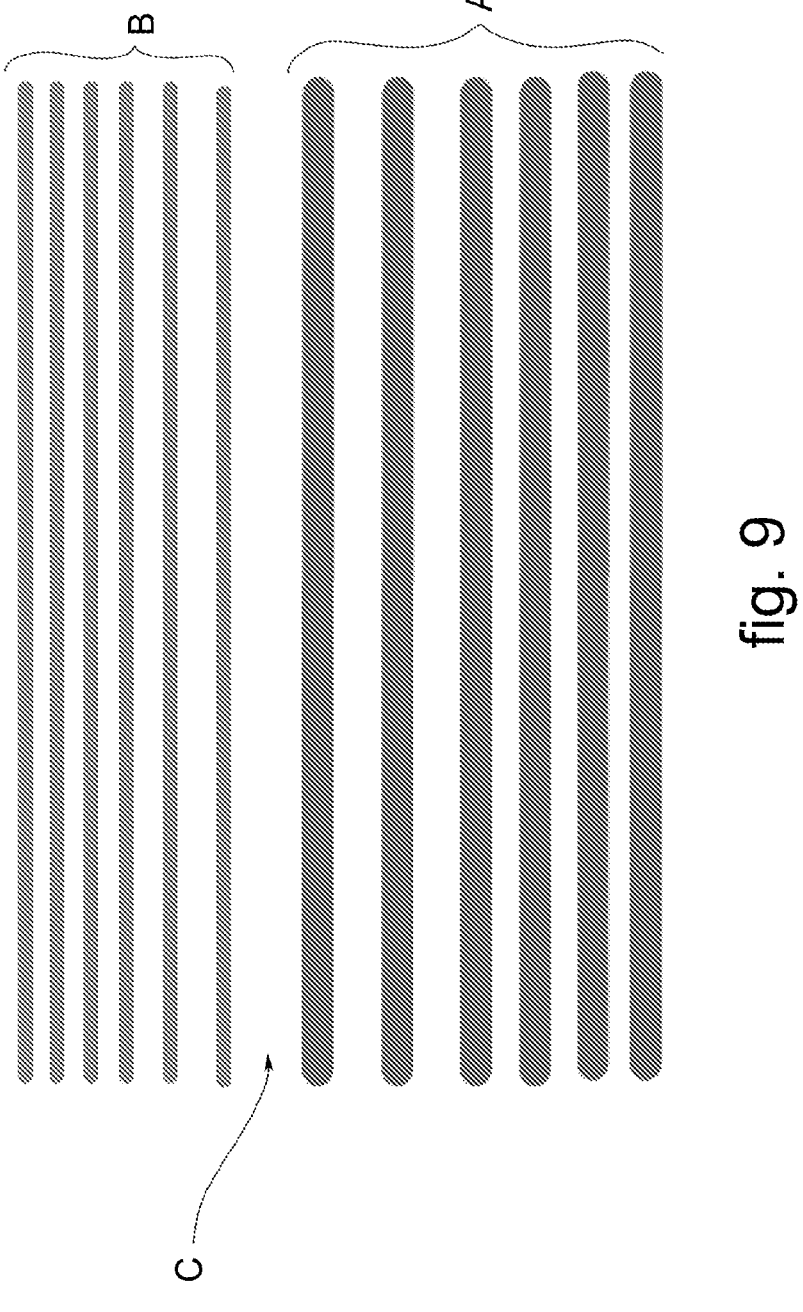
FIG. 9 is a schematic representation of the structure of a multilayer sound-absorbing material, which does not correspond to the teaching of the present invention, involving the solidarization of the material by two-stage thermobonding.
Figure 10:
FIG. 10 is a microscopic photograph of a sound-absorbing material corresponding to the diagram in FIG. 9.

The structure of a material wherein thermobonding is accomplished in two steps is illustrated in the diagram in FIG. 9 and visible in the photomicrograph in FIG. 10. This material (not made in accordance with the present invention) is for all intents and purposes a multilayer; between the two layers A and B of this material there is a clear interface surface C, at which delamination phenomena occur.

In accordance with an alternative preferred embodiment, illustrated in the diagram in FIG. 7, the monolithic main layer 10 comprises an intermediate portion 13 which:

is between said first 11 and said second portion 12;

covers a remaining fraction of the thickness of said monolithic main layer 10, consists of a mixture of fibers from the first portion 11 and fibers from the second portion (12), has a non-homogeneous density and has a part of the fibers oriented in the direction of thickness (see FIG. 7, schematic elements indicated with 14).

Advantageously, in said intermediate portion 13, fibers of the first portion 11 are interlaced with fibers of the second portion 12.

More specifically, as may be seen in the photomicrograph in FIG. 8, in this case the transition zone between the two multi-ply structures is characterized by an irregular discontinuity, defined by localized areas of interlaced fibers 14, and non-homogeneous density. Such irregularities, as well as the presence of fibers oriented along the thickness of the monolithic main layer 10 further reduce the risks of delamination.

Preferably, in such a case, the monolithic main layer 10 is obtained by the superposition of the multi-ply structures of the two portions 11 and 12 exiting from respective crosslappers and subsequent single-pass needling treatment suitable for creating said intermediate portion 13. This needling treatment is followed by a thermobonding treatment that is simultaneously aimed at consolidating the two multi-ply structures and further joining them together.

Advantageously, the presence of the intermediate portion 13, obtained by needling, locally increases the tortuosity in the transition zone between the first portion 11 and the second portion 12. More specifically, the action of the needles leads to the formation of channels that overlap the three-dimensional random structure of the nonwoven fabric. This disorder/non-homogeneity increases acoustic wave dissipation phenomena within the material, increasing sound absorption.

In particular, the interface/transition zone defined by the intermediate portion 3, due in part to the mixture of fibers of different diameters, generates multilevel reflection when penetrated by acoustic waves and, due to the complex structure of the pores composed of different types of fibers, enhances the dissipation of medium-frequency acoustic waves.

According to a first embodiment of the invention, illustrated in the diagrams in FIGS. 5 and 7, the sound-absorbing material 1 consists only of said monolithic main layer 10. In such a case, in use, said sound-absorbing material 1 may be oriented by indifferently exposing one of the two faces 10' and 10" to the source of noise.

Figures 11, 12:
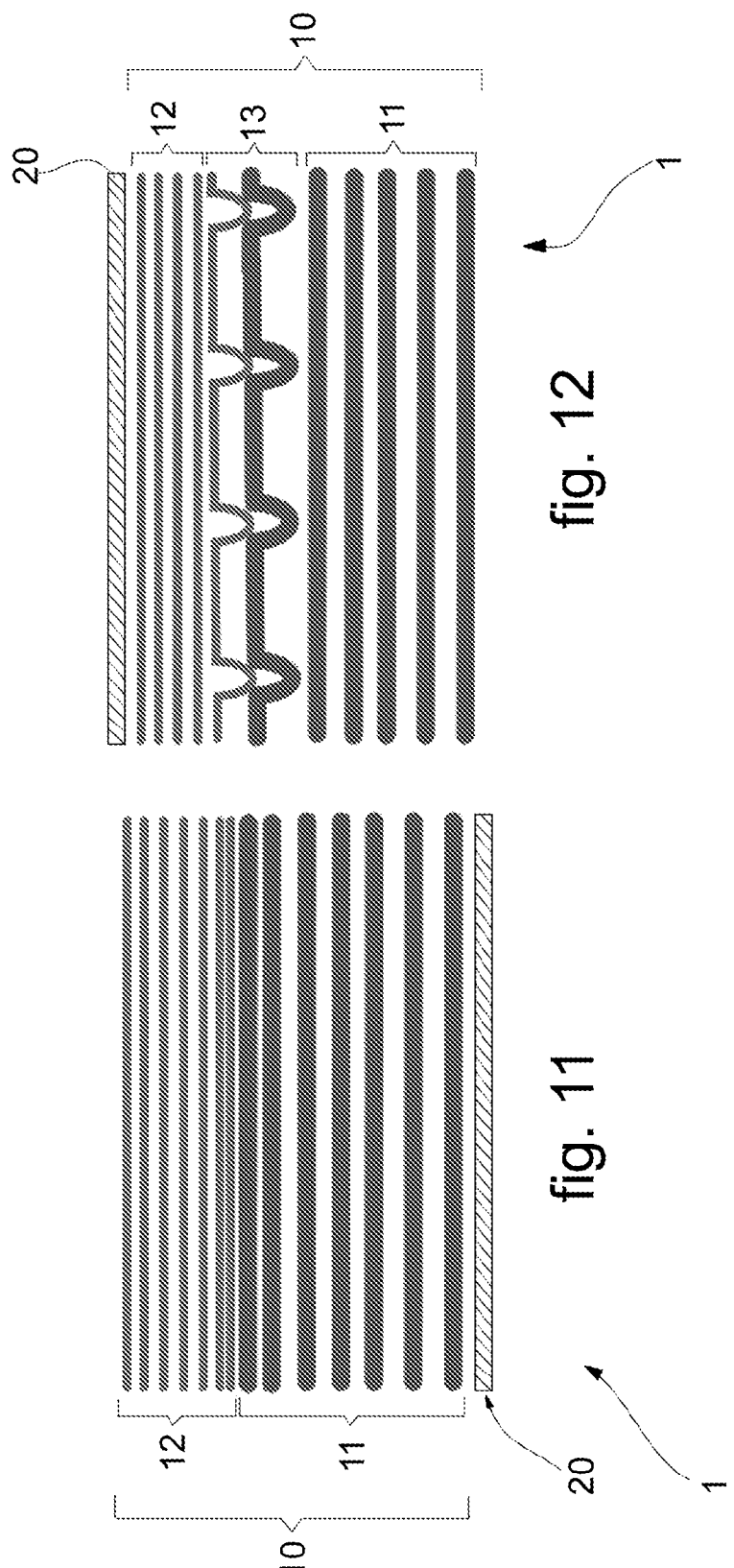
FIGS. 11 and 12 are, respectively, a schematic representation of the structure of a sound-absorbing material in accordance with two different preferred embodiments of the invention, wherein the monolithic main layer is coupled with a secondary layer.

According to a second embodiment of the invention, illustrated in the diagrams in FIGS. 11 and 12, the sound-absorbing material 1 comprises at least one secondary layer 20 in a material having a permeability to air which is lower than the permeability to air of the monolithic main layer 10. The secondary layer 20 has a permeability to air below 850 L/m2s at a vacuum of 200 Pa (measured in accordance with ISO 9237).

The secondary layer 20 is associated with said monolithic main layer 10 at said first face 10' or said second face 10".

Advantageously, it could be verified experimentally how the addition of said secondary layer 20 improves the sound absorption capacity of the sound-absorbing material 1 according to the invention.

Preferably in use said sound-absorbing material 1 is intended to be oriented so that said secondary layer 20 is first hit by the acoustic waves emitted by the source of noise.

Advantageously, said at least one secondary layer 20 consists of at least one layer of non-woven fabric of spunlace, meltblown, or spunbond type or by a multilayer of combinations thereof.

Preferably, said at least one secondary layer 20 consists of a trilaminate SMS (spunbond-meltblown-spunbond).

In particular, the single layer of MELTBLOWN nonwoven fabric is composed of polypropylene microfibers with a diameter between 1 and 2 dtex. The production of meltblown is characterized by the extrusion of molten polymer through a specific technology called "blow spinning". Through the stretching action of compressed and super-heated air, the molten polymer mass is transformed into long and very thin fibers that are projected onto a collection support (typically a conveyor belt) traversed by a cooling air flow. This creates a web of finely entangled microfibers that is collected onto reels and then converted into finished products.

In particular, the single layer of spunbond nonwoven fabric is produced through the continuous process of spun fibers. The polymer is extruded and elongated to form filaments. The filaments are arranged in a web; the resulting fabric self-bonds during thermal, chemical, or mechanical treatments. The raw materials of spunbond nonwoven fabric include PP (polypropylene), PET (polyester), nylon, and PE (polyethylene). The most widely used is long-fiber PP. The PP spunbond nonwoven is stable, heat-resistant, resistant to aging, and exhibits good permeability to air.

Advantageously, SMS trilaminates may also be produced offline by laminating layers of spunbond and meltblown through thermal bonding systems. Spunbond-meltblown-spunbond, commonly known as SMS is a trilaminated nonwoven fabric. It consists of a top layer of spunbond polypropylene, an intermediate layer of meltblown polypropylene, and a bottom layer of spunbond polypropylene.

Preferably, said at least one secondary layer 20 is associated with said monolithic main layer 10 by a connection layer of thermoplastic or bonding material and/or by connection bridge structures defined by thermobonded fibers contained at least in the monolithic main layer 10.

In particular, the connection layer of thermoplastic material may be obtained by depositing powdered thermoplastic material at the interface between the main layer 10 and the secondary layer 20. The connection layer may be homogeneous and continuous or, preferably, non-homogeneous with an island structure.

The present invention also pertains to a method for producing the sound-absorbing material 1 according to the present invention, and in particular as described above.

Said method comprises the following operational steps:

a) producing by a first carding machine and a first crosslapper a first multi-ply structure formed by a mixture of thermoplastic staple fibers and thermobonding staple fibers;

b) producing by a second carding machine and a second crosslapper a second multi-ply structure formed by a mixture of thermoplastic staple fibers and thermobonding staple fibers;

c) overlapping said first and second multi-ply structures with each other, forming a multi-ply assembly; and d) thermally treating said multi-ply assembly so as to activate at least a part of the thermobonding fibers so as to consolidate the two multi-ply structures internally and simultaneously solidarize said two multi-ply structures with each other, obtaining a consolidated and solidarized multi-ply assembly.

Step d) is a thermobonding treatment conducted directly on the multi-ply assembly. According to the invention, the method does not comprise thermobonding treatments carried out separately on individual multi-ply structures.

The consolidated and solidarized multi-ply assembly corresponds to the monolithic main layer 10; the first multi-ply structure corresponds to said first portion 11 of the monolithic main layer 10, while the second multi-ply structure corresponds to the second portion 12 of the monolithic main layer 10.

According to a first embodiment of the invention, the method provides that solidarization between the two multi-ply structures is obtained only by the aforesaid step d) consisting of thermal treatment (thermobonding).

Thus, as shown in the diagram in FIG. 5 and visible in the photomicrograph in FIG. 6, the two multi-ply structures seamlessly interpenetrate each other at the transition zone between the two portions 11 and 12. In other words, the two portions 11 and 12 are not separated by a clear interface surface. The transition zone between the two portions 11 and 12 is defined by the juxtaposition of two irregular surfaces defined by the multi-ply structures.

Operationally, through the process of thermobonding, at least part of the thermobonding fibers of both portions 11 and 12 have been thermally deformed and define connection bridge structures, both internally to both portions and at the interface between the first portion 11 and the second portion 12.

Preferably, following the single-stage thermobonding process, the thermobonding fibers were "activated" in a single thermal step. Thus, the connection bridge structures formed have a substantially homogeneous distribution and morphology in the two portions 11 and 12 and at the transition zone between the two portions. In this way, the interpenetration between the two portions 11 and 12 is more homogeneous than in the case of a material wherein the thermobonding is carried out in two steps (thermobonding the two portions separately to consolidate them, then thermobonding to join the two portions together). One-step thermobonding reduces the delamination phenomena.

In accordance with a second embodiment of the invention, the method provides that the solidarization between the two multi-ply structures is also obtained by needling to be carried out prior to step d) of heat treatment (thermobonding).

Advantageously, the method may thus comprise the further operational step e) of needling said multi-ply assembly before step d), so as to generate in the transition zone between the two multi-ply structures a portion that consists of fibers of the two multi-ply structures interlaced with each other and defines said intermediate portion 13.

More specifically, as illustrated in the diagram in FIG. 7 and visible in the photomicrograph in FIG. 8, in this case the transition zone between the two multi-ply structures is characterized by an irregular discontinuity, defined by localized areas of interlaced fibers and non-homogeneous density.

Advantageously, the presence of the intermediate portion 13, obtained by needling, increases the tortuosity locally in the transition zone between the first portion 11 and the second portion 12. More specifically, the action of the needles leads to the formation of channels that overlap the three-dimensional random structure of the nonwoven fabric. This disorder/non-homogeneity increases acoustic wave dissipation phenomena within the material, increasing sound absorption.

In particular, the interface/transition zone defined by the intermediate portion 3, due in part to the mixture of fibers of different diameters, generates multilevel reflection when penetrated by acoustic waves and, due to the complex structure of the pores composed of different types of fibers, enhances the dissipation of medium-frequency acoustic waves.

Preferably, the first multi-ply structure 11 has a basis weight between 60 and 500 g/m2 and a thickness along the direction Z between ⅔ and ¾ of the total thickness of the monolithic main layer 10; the second multi-ply structure 12 has a basis weight between 60 and 500 g/m2 and a thickness along the direction Z between ⅓ and ¼ of the total thickness of the monolithic main layer 10. The basis weight and thickness values of the two portions 11, 12 are chosen so that the density value corresponding to the ratio between the basis weight and the thickness of the first multi-ply structure 11 is less than the ratio between the basis weight and the thickness of the second multi-ply structure 12.

Preferably, the first average density $\rho 1$ of the first multi-ply 11 structure is between 10 kg/m3 and 30 kg/m3.

Preferably, the first average count T1 of the thermoplastic staple fibers of the first multi-ply 11 structure is between 1.5 dtex and 3.3 dtex.

Preferably, the second average density $\rho 2$ of the multi-ply structure 12 is between 20 kg/m3 and 60 kg/m3.

Preferably, the second average count T2 of thermoplastic staple fibers in the second multi-ply structure 12 is between 0.8 dtex and 1.7 dtex.

Preferably, the monolithic main layer 10 as a whole has a basis weight between 120 and 1000 g/m2 and a total thickness along the direction Z between 10 and 40 mm.

The basis weight measurement method is defined by EN ISO 9073 PART 1, while the thickness measurement method is defined by EN ISO 9073 PART 2.

In accordance with a particularly preferred embodiment, the first multi-ply structure 11 consists of:

from 70% to 90% by weight of thermoplastic staple fibers having a count between 1.5 and 1.7 dtex, preferably from 75% to 85% by weight; and from 10% to 30% by weight of thermobonding fibers, preferably from 15% to 25% by weight.

Alternatively, the first multi-ply structure 11 may consist of:

from 40% to 80% by weight of thermoplastic staple fibers having a count between 1.5 and 1.7 dtex, preferably from 50% to 75% by weight; and from 10% to 30% by weight of thermoplastic staple fibers having a count between 2.2 and 3.3 dtex, preferably from 10% to 25% by weight; and from 10% to 30% by weight of thermobonding fibers, preferably from 15% to 25% by weight.

In accordance with the aforesaid particularly preferred embodiment, the second multi-ply 12 structure consists of:

from 20% to 45% by weight of thermoplastic staple fibers having a count between 0.8 and 1.1 dtex, preferably from 25% to 40% by weight;

from 25% to 70% by weight of thermoplastic staple fibers having a count between 1.5 and 1.7 dtex, preferably from 35% to 60% by weight; and from 10% to 30% by weight of thermobonding fibers, preferably from 15% to 25% by weight.

Advantageously, the aforesaid thermobonding fibers have counts between 2.2 dtex and 4.4 dtex, preferably 2.2 dtex.

Advantageously, at least part of said thermoplastic staple fibers are hollow fibers. The hollow fibers provide more surface area with less weight; therefore, they allow for improved sound absorption. The structure of hollow fibers, which contain air within their lumen, increases the volume of air in the nonwoven fabric and increases its capacity to absorb acoustic waves, without increasing its capacity to reflect them.

Preferably, the aforesaid thermoplastic staple fibers are crimped fibers, preferably having a degree of crimp of not less than 3 waves/cm. The crimp of the fibers imparts more pronounced resilience properties to the nonwoven fabric made from these fibers.

Advantageously, a three-dimensional crimp of the fibers combined with the presence of hollow fibers allows for superior resilience and increased insulation of the finished product (HCS conjugated polyester fibers); these fibers allow for reduced thickness loss after compression.

Advantageously, at least some of the aforesaid thermoplastic staple fibers are fibers having special cross-section (cross-shape, octalobed, trilobed, pentalobed). The presence of these fibers increases total surface area being the volume equal, improving sound absorption properties compared to the case of using only standard, circular-section fibers.

Advantageously, the aforesaid thermoplastic staple fibers consist of a material selected from the group consisting of: polyesters, polyamides, polyolefins, acrylics, aramidics, PPS, PBI, melamines, vinyls, viscose.

In particular, "polyester fiber" refers to the general name for polyester-based fiber produced by the polycondensation of various diols and aromatic bicarboxylic acids or their esters. The specific varieties of polyester fibers are: polyethylene terephthalate fiber, polybutylene terephthalate fiber, polytrimethylene terephthalate fiber, poly-1,4-cyclohexane dimethyl terephthalate fiber, poly-2,6-ethylene naphthalate fiber, and a variety of modified polyethylene terephthalate fibers (such as CDP, ECDP, EDDP), polyamide, etc. Since polyethylene terephthalate fiber is the most widely used, "polyester fiber" usually refers to this fiber.

Advantageously, the aforesaid thermobonding fibers may have different shapes and configurations and in particular the core/sheat configuration, the side-by-side configuration, and the islands-in-the-sea configuration.

Preferably, the aforesaid thermobonding fibers have a core-sheat shape.

In particular, the core-sheat fibers contain at least two polymers with different melting and/or softening points; the component with the highest softening and/or melting temperature is normally found on the inner side. The bonding function of said fibers is achieved by partial/total melting of the outer part.

Preferably, the core-sheat type thermobonding fibers have the outer part made of polybutylene terephthalate, polyamide, polyethylene, copolyamide, and/or copolyesters, while the inner part is made of polyester, especially polyethylene terephthalate and/or polyethylene naphthalate and/or polyolefins.

In accordance with a particular embodiment of the invention, the method comprises the further operational steps of:

e) providing a secondary layer 20 in a material having a permeability to air which is less than the permeability to air of the monolithic main layer (10); and f) associating said secondary layer 20 to said monolithic main layer 10 at said first face 10' or said second face 10".

The secondary layer 20 has a permeability to air below 850 L/m2s at a vacuum of 200 Pa (measured in accordance with ISO 9237).

Advantageously, said at least one secondary layer 20 consists of at least one layer of non-woven fabric of spunlace, meltblown, or spunbond type or by a multilayer of combinations thereof.

Preferably, said at least one secondary layer 20 consists of a trilaminate SMS (spunbond-meltblown-spunbond).

Preferably, step f) of associating said at least one secondary layer 20 with said monolithic main layer 10 is carried out by a connection layer of thermoplastic or bonding material and/or by bridging structures defined by thermobonding fibers contained in at least the monolithic main layer 10.

In particular, the connection layer of thermoplastic material may be obtained by depositing powdered thermoplastic material at the interface between the main layer 10 and the secondary layer 20. The connection layer may be homogeneous and continuous or, preferably, non-homogeneous with an island structure.

An acoustic characterization of the sound-absorbing material has been conducted according to the invention.

Some samples of the sound-absorbing material according to the invention were subjected to sound-absorption tests, contextually comparing them with conventional sound-absorbing materials of homogeneous type. Sound-absorbing materials according to the invention were subjected to the sound absorption tests by exposing the second portion 12 (finer) to the source of noise in the case wherein the sound-absorbing material consists only of the monolithic main layer 10; in the case wherein the sound-absorbing material also comprises the secondary layer 20, the tests were conducted by exposing the secondary layer 20 to the source of noise.

In all the examples, the thermobonding fibers used are two-component core-sheat fibers, with the melting temperature of the shell at 110° C.

Comparative Example 1

Two nonwoven sound-absorbing materials were compared by measuring their sound absorption coefficient α with the impedance tube (ISO 10534). The sound absorption coefficient alpha is defined as the ratio between the sound energy of a plane wave with normal incidence passing through the material without return (and thus dissipated) and the total incident energy of the aforesaid wave. The results of these measurements are illustrated in the graph in FIG. 1, which shows the trend of absorption coefficient α with respect to acoustic frequency. The two materials have the same basis weight (weight per unit area) of 300 g/m2, the same thickness of 15 mm, and the same average fiber count (dtex avg) of 2.1 dtex. The two materials were made in a similar way by thermobonding through low-melt, two-component fibers. They differ in internal structure. A first material (called SAMPLE 1) is made in accordance with the invention and has along its thickness a density gradient and a gradient in fiber count (with inverse trends with respect to each other). The thermobonding of SAMPLE 1 was carried out by applying an effective temperature of 185° C. to the material using a ventilated oven, for a total residence time of 8 minutes. The second material (referred to as REFERENCE MATERIAL 1) has homogeneous density and fiber count along its thickness. The following is a detailed description of the construction of the two compared materials.

SAMPLE 1: Sound-absorbing material according to the present invention consists of only the monolithic main layer 10, structured on a first portion 11 and a second portion 12; composition of the first portion (11): 20% two-component white polyester fiber count 4.4 dtex and 80% white polyester fiber count 1.7 dtex (average count 2.24 dtex); and composition of the second portion (12): 20% two-component white polyester fiber count 4.4 dtex, 35% white polyester fiber count 0.9 dtex and 45% white polyester fiber count 1.7 dtex (average count 1.96 dtex).

The total basis weight and thickness of the material of 300 g/m2 and 15 mm are distributed as follows: the first portion (11) with 150 g/m2 basis weight and 10 mm thickness (density 15 kg/m3), the second portion (12) with 150 g/m2 basis weight and 5 mm thickness (density 30 kg/m3).

The overall average count of the material is therefore 2.1 dtex.

REFERENCE MATERIAL 1: Homogeneous material with composition: 15% two-component white polyester fiber count 2.2 dtex and 85% white polyester fiber count 1.7 dtex (average count 2.1 dtex). The total basis weight and thickness of the material are 300 g/m2 and 15 mm.

As may be seen in the graph in FIG. 1, SAMPLE 1 shows an improved sound absorption coefficient of up to 10% in the frequency range of 1000 to 6000 Hz compared to the REFERENCE MATERIAL 1. Being the basis weight, thickness, and average fiber count (dtex avg) equal, this result is attributable to the different structure of the two materials and specifically to the presence of a density gradient and a gradient in the fiber count along the thickness in SAMPLE 1, and thus to the resulting porosity and tortuosity gradients.

In general, it is observed that adding a layer of material with low permeability to air (SMS) improves acoustic performance. Sound absorption performance also depends in part on the permeability to air of the materials. In general, by decreasing the permeability to air of an acoustic material, it is possible to increase the absorption performance in the medium-low frequencies (100-2500 Hz); this frequency range is usually the most difficult to abate.

Comparative Example 2

The same two nonwoven sound-absorbing materials tested in the comparative example 1 were compared. In this case, however, both materials were coupled with a nonwoven fabric layer made of spunbonded-meltblown-spunbonded polypropylene filaments (called commonly and henceforth SMS) with weight per unit area of 40 g/m2, thickness of 0.1 mm, and permeability to air of 750 L/m2s at 200 Pa. The sound absorption coefficient α was measured with the impedance tube (ISO 10534). The results of these measurements are illustrated in the graph in FIG. 2, which shows the trend of the absorption coefficient α with respect to the acoustic frequency.

The two materials tested were named: SAMPLE 2 (according to the invention with monolithic main layer 10 and secondary layer 20) and REFERENCE MATERIAL 2.

SAMPLE 2: material according to the present invention composed of the previously described SAMPLE 1 coupled by dosing 15 g/m2 of polyethylene powder with SMS of 40 g/m2.

REFERENCE MATERIAL 2: homogeneous material composed of the previously described REFERENCE MATERIAL 1 coupled by dosing 15 g/m2 polyethylene powder with SMS of 40 g/m2.

Figure 2:
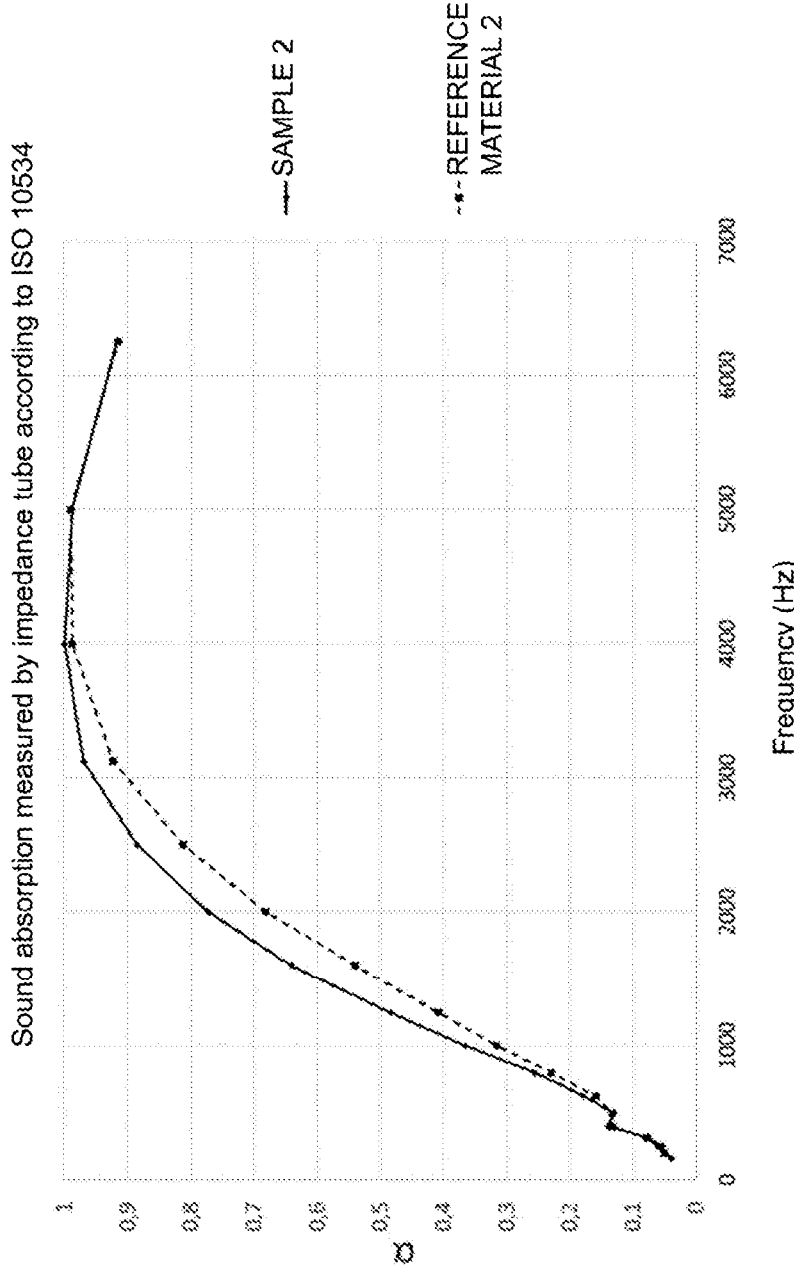

As may be seen in the graph in FIG. 2, SAMPLE 2 shows an improved sound absorption coefficient of up to 8% in the frequency range of 1000 to 4000 Hz with respect to the REFERENCE MATERIAL 2. Being the basis weight, thickness and average fiber count (dtex avg) equal, net of the contribution of the SMS layer present in both materials, this result may be attributed to the different structure of the two materials and specifically to the presence of a density gradient and gradient in the fiber count along the thickness in the monolithic main layer 10 of SAMPLE 1, and thus to the resulting porosity and tortuosity gradients.

Further, by comparing the sound absorption curves of SAMPLE 1 and SAMPLE 2, one may note the improved effect on the coefficient of sound absorption provided by the presence of the SMS layer, while maintaining the same features of the monolithic main layer.

Comparative Example 3

Two nonwoven sound-absorbing materials were compared by measuring their sound absorption coefficient α with the impedance tube (ISO 10534). The results of these measurements are illustrated in the graph in FIG. 3, which shows the trend of the absorption coefficient α with respect to the acoustic frequency. The two materials have the same basis weight (weight per unit area) of 500 g/m2, the same thickness of 15 mm, and the same average fiber count (dtex avg) of 2.1 dtex. The two materials were made in a similar way by thermobonding through low-melt, two-component fibers. They differ in internal structure. A first material (called SAMPLE 3) is made in accordance with the invention and has along its thickness a density gradient and a gradient in the fiber count (with inverse trends with respect to each other). The thermobonding of SAMPLE 3 was carried out by applying an effective temperature of 200° C. to the material using a ventilated oven, for a total residence time of 12 minutes. The second material (referred to as REFERENCE MATERIAL 3) has homogeneous density and fiber count along its thickness. The following is a detailed description of the construction of the two compared materials.

SAMPLE 3: sound-absorbing material according to the present invention consists of only the monolithic main layer 10, structured on a first portion 11 and a second portion 12; composition of the first portion (11): 20% two-component white polyester fiber count 4.4 dtex and 80% white polyester fiber count 1.7 dtex (average count 2.24 dtex); and composition of the second portion (12): 20% two-component white polyester fiber count 4.4 dtex, 35% white polyester fiber count 0.9 dtex and 45% white polyester fiber count 1.7 dtex (average count 1.96 dtex).

The total basis weight and thickness of the material of 500 g/m2 and 15 mm are distributed as follows: the first portion (11) with basis weight 250 g/m2 and thickness 10 mm (density 25 kg/m3), the second portion (12) with basis weight 250 g/m2 and thickness 5 mm (density 50 kg/m3).

The overall average count of the material is therefore 2.1 dtex.

REFERENCE MATERIAL 3: Homogeneous material with composition: 15% two-component white polyester fiber count 2.2 dtex and 85% white polyester fiber count 1.7 dtex (average count 2.1 dtex). The total basis weight and thickness of the material are 500 g/m2 and 15 mm.

Figure 3:
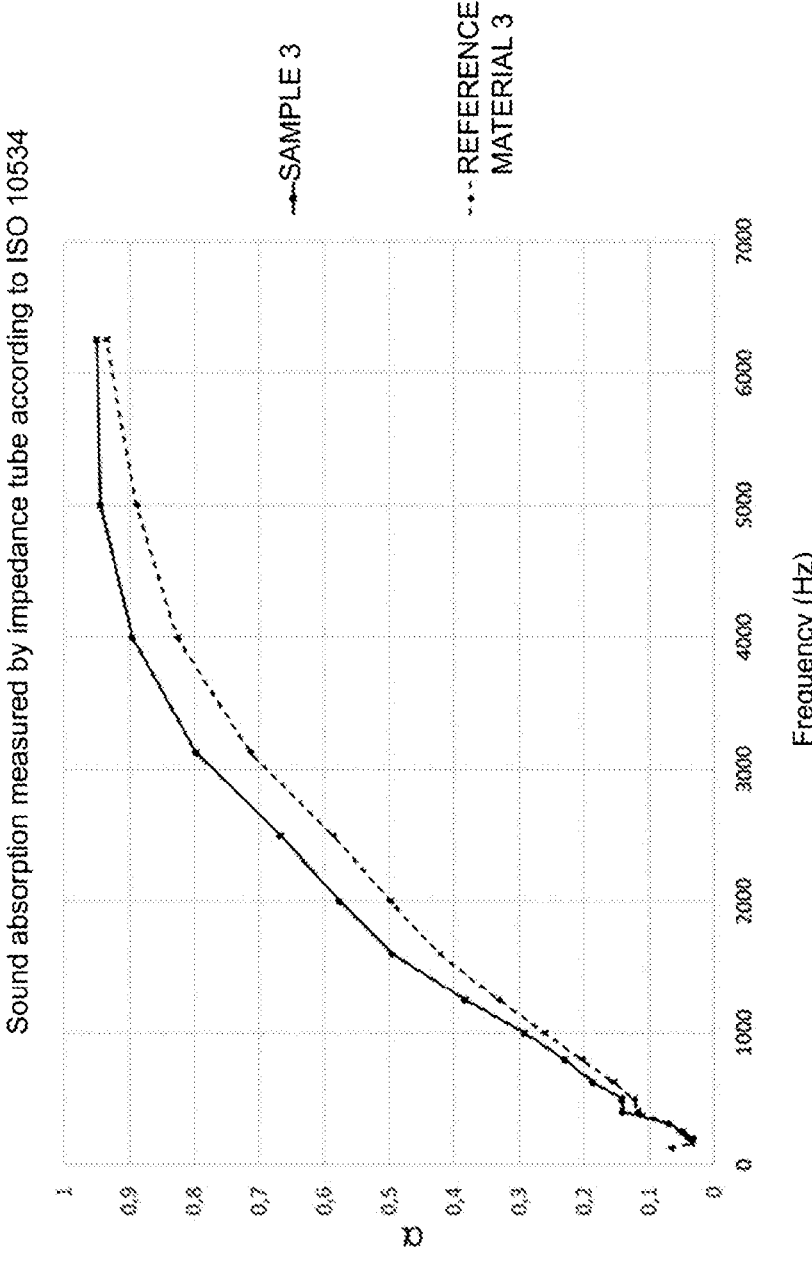

As may be seen in the graph in FIG. 3, SAMPLE 3 shows an improved sound absorption coefficient of up to 8% in the frequency range of 1000 to 6000 Hz compared with REFERENCE MATERIAL 3. Being the basis weight, thickness and average fiber count (dtex avg) equal, this result is attributable to the different structure of the two materials and specifically to the presence of a density gradient and a gradient in the fiber count along the thickness in SAMPLE 3, and thus to the resulting porosity and tortuosity gradients.

Moreover, comparing the sound absorption curves of SAMPLE 1 and SAMPLE 3, one may note the improving effect on the sound absorption coefficient given by the increase in basis weight being the thickness and fiber count equal.

Comparative Example 4

Two nonwoven sound-absorbing materials were compared by measuring their sound absorption coefficient α with the impedance tube (ISO 10534). The results of these measurements are illustrated in the graph in FIG. 4, which shows the trend of the absorption coefficient α with respect to the acoustic frequency. The two materials have the same basis weight (weight per unit area) of 500 g/m2, the same thickness of 25 mm, and the same average fiber count (dtex avg) of 2.1 dtex. The two materials were made in a similar way by thermobonding through low-melt, two-component fibers. They differ in internal structure. A first material (called SAMPLE 4) is made in accordance with the invention and has along its thickness a density gradient and a gradient in the fiber count (with inverse trends with respect to each other). The thermobonding of SAMPLE 4 was carried out by applying an effective temperature of 200° C. to the material using a ventilated oven, for a total residence time of 12 minutes. The second material (referred to as REFERENCE MATERIAL 4) has homogeneous density and fiber count along its thickness. The following is a detailed description of the construction of the two compared materials.

SAMPLE 4: Sound-absorbing material according to the present invention consists of only the monolithic main layer 10, structured on a first portion 11 and a second portion 12; composition of the first portion (11): 20% two-component white polyester fiber count 4.4 dtex and 80% white polyester fiber count 1.7 dtex (average count 2.24 dtex); and composition of the second portion (12): 20% two-component white polyester fiber count 4.4 dtex, 35% white polyester fiber count 0.9 dtex and 45% white polyester fiber count 1.7 dtex (average count 1.96 dtex).

The total basis weight and thickness of the material of 500 g/m2 and 25 mm are distributed as follows: the first portion (11) with basis weight 250 g/m2 and thickness 15 mm (density 16 kg/m3), the second portion (12) with basis weight 250 g/m2 and thickness 10 mm (density 25 kg/m3).

The overall average count of the material is therefore 2.1 dtex.

REFERENCE MATERIAL 4: Homogeneous material with composition: 15% two-component white polyester fiber count 2.2 dtex and 85% white polyester fiber count 1.7 dtex (average count 2.1 dtex). The total basis weight and thickness of the material are 500 g/m2 and 15 mm.

Figure 4:
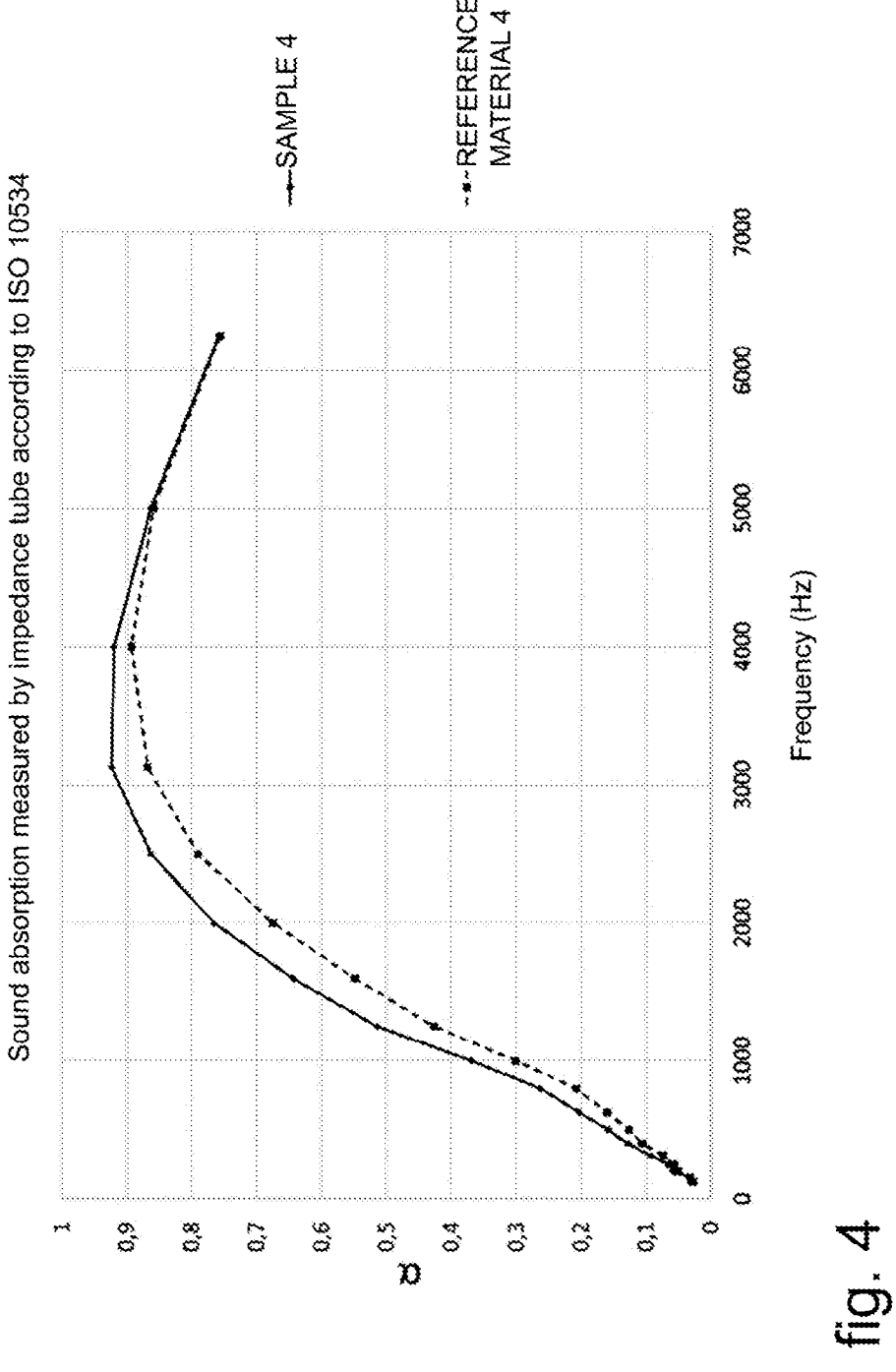

As may be seen in the graph in FIG. 4, SAMPLE 4 shows an improved sound absorption coefficient of up to 8% in the frequency range of 500 to 4500 Hz with respect to the REFERENCE MATERIAL 4. Being the basis weight, thickness, and average fiber count (dtex avg) equal, this result may be attributed to the different structure of the two materials and specifically to the presence of a density gradient and a gradient in the fiber count along the thickness in SAMPLE 4, and thus to the resulting porosity and tortuosity gradients.

Furthermore, by comparing the acoustic absorption curves of SAMPLE 4 and SAMPLE 3, one may note the improvement in the coefficient of sound absorption resulting from the increase in thickness, while keeping the basis weight and fiber count constant, within the range of 1000 to 3000 Hz.

Numerous studies on sound absorption in porous materials have concluded that low-frequency sound absorption has a direct relationship with thickness. For homogeneous materials, the sound absorption is therefore directly proportional to the thickness of the material. Sound absorption increases particularly at low frequencies by increasing the thickness of the material. Low frequency means high wavelength; therefore, high acoustic wavelengths may be absorbed more effectively if the material is thicker.

Example 5

The sound absorption coefficient α was measured with the impedance tube (ISO 10534) of a material (named SAMPLE 5) made in accordance with the invention that has a density gradient and a gradient in the fiber count along its thickness (with inverse trend to each other). The material was created through thermal bonding using low-melt, two-component fibers with the application of an effective temperature of 200° C. on the material by a ventilated oven, for a total residence time of 12 minutes. The result of the measurement is illustrated in the graph in FIG. 13, which shows the trend of the absorption coefficient α with respect to the acoustic frequency. SAMPLE 5 has basis weight (weight per unit area) of 800 g/m2, thickness of 40 mm and average fiber count (dtex avg) of 2.1 dtex.

SAMPLE 5: Sound-absorbing material according to the present invention is composed of only the monolithic main layer 10, structured on a first portion 11 and a second portion 12; composition of the first portion (11): 20% two-component white polyester fiber count 4.4 dtex and 80% white polyester fiber count 1.7 dtex (average count 2.24 dtex); and composition of the second portion (12): 20% two-component white polyester fiber count 4.4 dtex, 35% white polyester fiber count 0.9 dtex and 45% white polyester fiber count 1.7 dtex (average count 1.96 dtex).

The total basis weight and thickness of the material of 800 g/m2 and 40 mm are distributed as follows: the first portion (11) with basis weight 400 g/m2 and thickness 25 mm (density 16 kg/m3), the second portion (12) with basis weight 400 g/m2 and thickness 15 mm (density 25 kg/m3).

The overall average count of the material is therefore 2.1 dtex.

Figure 13:
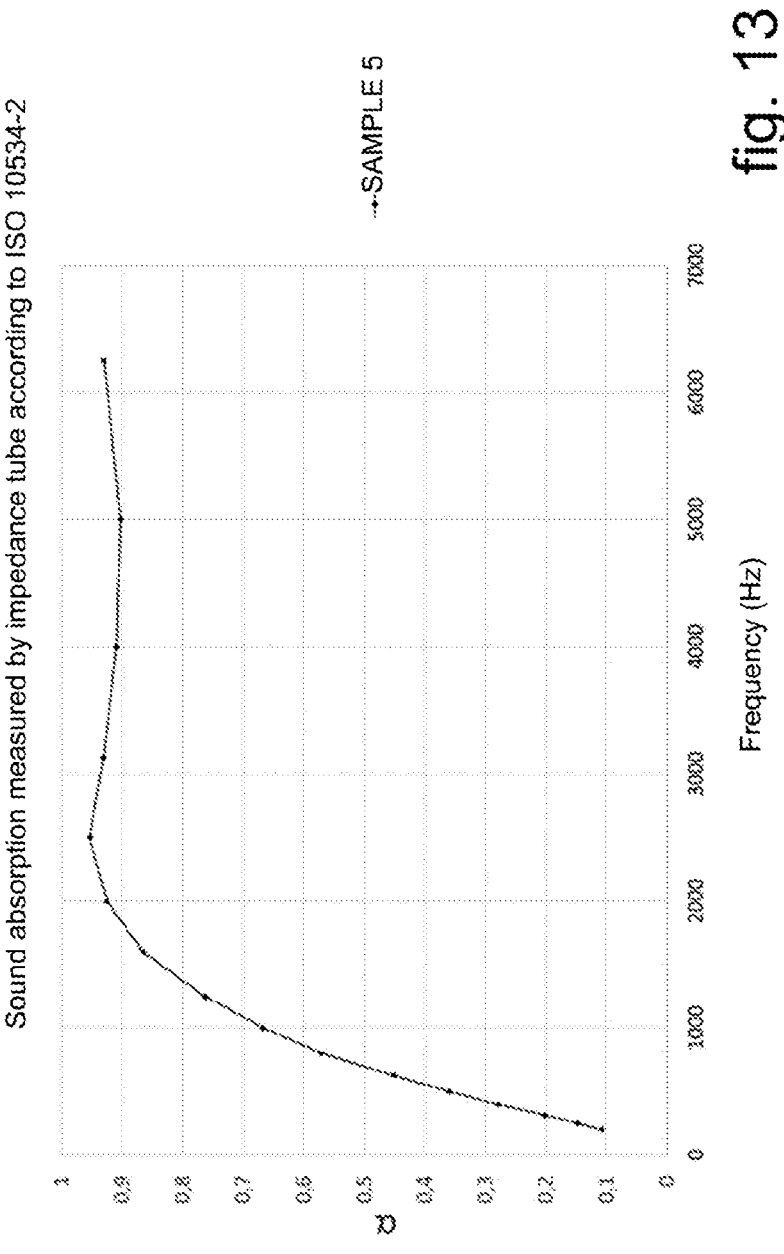
FIG. 13 is the graph related to the sound absorption coefficient with respect to the frequency of an additional sound-absorbing material according to the invention.

As may be seen in the graph in FIG. 13, SAMPLE 5 shows a very high sound absorption coefficient already as high as 500 Hz, maintaining a very good performance even at higher frequencies up to 6000 Hz. This improving trend is a consequence of the thickness and basis weight of the material being greater than the material samples according to the invention used in the previous examples.

A thermal and mechanical characterization of the sound-absorbing material according to the invention was made, adopting the following reference standards.

PERMEABILITY: method according to UNI EN ISO 9237 DIN 53887 Permeability to air refers to the velocity of an air flow which passes through a specimen perpendicularly under specific conditions of traversed surface, vacuum, and time.

THERMAL CONDUCTIVITY: method according to EN 12667

Thermal conductivity ($[X]=W/m*K$) is a physical magnitude that quantifies the ability of a material to transmit heat. The lower the conductivity value of a product, the better its inherent thermal insulation properties.

COMPRESSIBILITY: internal method according to DIN 12431; expression of results according to DIN 53885

In particular, the internal method involves the use of a different tool than what is stated in the reference standard: a sample with dimensions of 100 mm×100 mm, a meter with a millimeter scale, a metal plate with dimensions of 120 mm×120 mm, and a cylindrical weight with the correct weight according to the standard in order to generate a pressure of 250 Pa, or 1 kPa, or 2 kPa on the sample.

The thickness of the sample is checked before testing– initial thickness t0 in millimeters. The metal plate (100 g) is placed on the sample by aligning it centrally. The cylindrical weight is placed in the central zone marked on the measuring plate with the correct weight.

The absolute compressibility is determined as follows:

$$Ca \text{ [mm]} = t0 - t1$$

Where t0 is the initial sample thickness in millimeters, and t1 is the final sample thickness in millimeters subjected to weight loading.

Relative compressibility Cr in % is:

$$Cr[\%] = Ca*100/t0$$

RESILIENCE AFTER CYCLE COMPRESSION: internal method; expression of results according to DIN EN ISO 1856.

RESILIENCE: DIN EN ISO 1856.

Resilience is evaluated as the difference in thickness of a material subjected to compressive deformation for a specific time, at a specific temperature, and with a recovery time for the material. A sample of material having a size of 100 mm×100 mm is loaded with a weight of 1.1 kg (so that a pressure of 1 kPa is generated) placed on top of a metal plate for 24 hours at room temperature (23±2° C.); after 24 hours, the weight and metal plate are removed, and the thickness of the material is measured after 30 minutes of recovery.

Compression is thus determined:

$$CS[\%] = (t0 - tr)*100/t0$$

Where t0 is the initial sample thickness in millimeters and tr is the final sample thickness in millimeters after recovery The resilience of the material is calculated using the following formula:

$$R[\%] = 100 - CS$$

The results of measurements of permeability to air, thermal conductivity, compressibility, and resilience after cyclic compression are shown in the following tables.

TABLE 1

| PERMEABILITY TO AIR $(L/m^2s)$ | | |
| --- | --- | --- |
| | Vacuum 200 Pa | Vacuum 100 Pa |
| SAMPLE 1 | 1670 | 1041 |
| SAMPLE 2 | 733 | 375 |
| SAMPLE 3 | 916 | 500 |

TABLE 2

| THERMAL CONDUCTIVITY at a thickness of 15 mm | (W/m*K) |
| --- | --- |
| SAMPLE 1 | 0.033 |
| REFERENCE MATERIAL 1 | 0.035 |
| SAMPLE 3 | 0.032 |
| REFERENCE MATERIAL 3 | 0.033 |

As may be seen from Table 2, the sound-absorbing material according to the invention has a lower thermal conductivity value than the reference material, both comparing the pair in Example 1 with equal basis weight, thickness, and average count of 300 g/m2, 15 mm, and 2.1 dtex, and comparing the couple in Example 3 with equal basis weight, thickness, and average count of 500 g/m2, 15 mm, and 2.1 dtex. With the progression of density and count, there is also an improving effect on the thermal insulation properties of the material (decrease in thermal conductivity).

TABLE 3

| COMPRESSIBILITY % (after 120 sec of applying the reported pressure) | | | |
| --- | --- | --- | --- |
| | 250 Pa | 1 kPa | 2 kPa |
| SAMPLE 1 | 23.5 | 50.0 | 55.9 |
| SAMPLE 3 | 23.7 | 42.1 | 50.0 |

TABLE 4

| | RESILIENCE % |
| --- | --- |
| SAMPLE 1 | 85.29 |
| SAMPLE 3 | 92.11 |

From Tables 3 and 4, the data collected highlight that the material according to the invention has good compressibility and resilience. The material is therefore easily compressible and adaptable to complex geometries and/or spaces.

TABLE 5

| RESILIENCE after CYCLICAL COMPRESSION % (after 500 compression cycles at 80%) | |
| --- | --- |
| SAMPLE 5 | 94 |

The data in Table 5 show that the material according to the invention also exhibits good resilience even when subjected to cyclic compression.

The invention allows numerous advantages to be obtained, which have already been described in part.

The sound-absorbing material 1 according to the invention due to comprising the aforesaid monolithic main layer 10 has high sound absorption capabilities at low, medium, and high wave frequencies and is substantially not subject to delamination phenomena.

As pointed out previously, the high sound absorption capacity of the sound-absorbing material 1 according to the invention is related to the presence along the thickness of the monolithic main layer 10 of a density gradient and a gradient in the fiber count with inverse trends with respect to each other. This results in the presence of a porosity gradient and a tortuosity gradient along the thickness of said monolithic main layer 10. All of this results in sound absorption capacities with high-efficiency and wide-spectrum of frequency (high, medium, and low frequencies).

Due to the porosity gradient, the monolithic main layer 10 has a surface zone/portion with more open pores (first portion, coarse). This more open area allows medium to high frequency acoustic waves to pass through, which penetrate the structure and dissipate in the form of heat.

The non-homogeneity of tortuosity and porosity generates greater dissipation of waves as they pass through two phases, one with more open pores and one with more closed pores.

Further, the area with more closed pores functions in part as a facilitator of reflection of the waves, which by striking against the pore walls are reflected inward, thus changing direction and dissipating further.

Otherwise, if a material is homogeneous, dissipation occurs mainly along the direction of the thickness of the sample.

In particular, the sound-absorbing material according to the invention exhibits a higher coefficient of sound absorption compared to homogeneous sound-absorbing materials (i.e., those without density gradient and gradient of a fiber count) being the basis weight to equal. This means that compared to homogeneous materials with the material according to the invention, similar acoustic performance may be achieved with lower basis weight. This results in a reduction in the amount of material used and therefore cost.

The substantial absence of delamination phenomena results from the fact that the monolithic main layer is conceived from its production as a single material, and not as the assembly of different materials. In other words, the monolithic main layer is not a multilayer material.

The sound-absorbing material 1 according to the invention is likewise easy to manufacture. In fact, the monolithic main layer 10 (consisting of a nonwoven fabric) may be produced by a normal process of carding, crosslapping, and subsequent thermobonding, and optionally needling (before thermobonding).

The sound-absorbing material 1 according to the invention also exhibits high resilience. Unlike other solutions of the prior art, in the sound-absorbing material 1 according to the invention, and particularly in the monolithic main layer 10, the density gradient is not a consequence of a thermo-compressive treatment conducted on the material, which is likely to change the physical shape of the fibers (which melt and thicken locally). The density gradient is instead caused by a differentiation of the features of the nonwoven fabric (basis weight and thickness), directly generated during its production. Further, consolidation by thermobonding affects only a small part of the fibers (thermobonding), leaving the features of the other fibers that define the main structure of the nonwoven fabric unaffected. One feature of the fibers in particular that is not altered is crimp, which is essential to give the fibers elasticity and thus resilience. In addition, due to the fact that the thermobonding treatment does not alter the fibers themselves, nor the structure of the nonwoven, a significant part of the fibers retains high mobility, which allows them to vibrate. The vibration of the fibers helps to dissipate the acoustic wave, which is transformed into heat and therefore attenuated.

The sound-absorbing material 1 according to the invention also has high thermal insulation capabilities. In particular, the sound-absorbing material according to the invention shows lower thermal conductivity and thus better thermal insulation performance than traditional homogeneous materials; this may be attributed to the gradient of fiber count and density. In fact, the presence of a portion with finer fibers and higher density increases the thermal barrier effect. The compactness of this portion is offset by the softness of the portion with higher fiber count and lower density, which gives good compressive strength, i.e., resilience.

Finally, the sound-absorbing material 1 according to the invention has good mechanical properties to ensure durability/stability and workability.

The invention thus conceived therefore achieves its intended objectives.

Obviously, in practice it may also assume different forms and configurations from the one illustrated above, without thereby departing from the present scope of protection.

Furthermore, all details may be replaced with technically equivalent elements, and the dimensions, shapes, and materials used may be any according to the needs.

The invention claimed is:

1. A sound-absorbing material comprising;
   a monolithic main layer made of non-woven fiber fabric, and having two opposite faces delimiting a thickness of said monolithic main layer, said monolithic main layer having a density gradient in a direction of the thickness,
   wherein said monolithic main layer has a fiber count gradient in the direction of the thickness of the monolithic main layer which decreases, passing from a first face to a second face of said monolithic main layer, wherein the density gradient has an inverse trend relative to the fiber count gradient, so that zones of lower fiber count correspond to zones of higher density, and
   wherein the monolithic main layer comprises non-homogeneous tortuosity and porosity.

2. The sound-absorbing material according to claim 1, wherein said monolithic main layer comprises:
   a first portion defining the first face of said monolithic main layer and covering a first fraction of the thickness of said monolithic main layer, said first portion having a first predefined average density and containing fibers with a first predefined average count;
   a second portion defining the second face of said monolithic main layer and covering a second fraction of the thickness of said monolithic main layer, said second portion having a greater second predefined average density than said first predefined average density and containing fibers with a second predefined average count less than said first predefined average count.

3. The sound-absorbing material according to claim 2, wherein the first portion of said monolithic main layer consists of a first multi-ply structure formed by a mixture of thermoplastic staple fibers and thermobonding staple fibers, wherein the second portion of said monolithic main layer consists of a second multi-ply structure formed by a mixture of thermoplastic staple fibers and thermobonding fibers.

4. The sound-absorbing material according to claim 3, wherein said first portion has a basis weight between 60 and 500 g/m² and a thickness along a direction Z between ⅔ and ¾ of a total thickness of the monolithic main layer, and wherein said second portion has a basis weight between 60 and 500 g/m² and a thickness along the direction Z between ⅓ and ¼ of the total thickness of the monolithic main layer, basis weight values and thickness values of the two portions being chosen so that a density value corresponding to a ratio between a basis weight and the thickness of the first portion is less than a ratio between a basis weight and the thickness of the second portion.

5. The sound-absorbing material according to claim 2, wherein said first average density of the first portion is between 10 kg/m³ and 30 kg/m3.

6. The sound-absorbing material according to claim 2, wherein said first average count of the thermoplastic staple fibers of the first portion is between 1.5 dtex and 3.3 dtex.

7. The sound-absorbing material according to claim 2, wherein said second average density of the second portion is between 20 kg/m$^3$ and 60 kg/m3.

8. The sound-absorbing material according to claim 2, wherein said second average count of the thermoplastic staple fibers of the second portion is between 0.8 dtex and 1.7 dtex.

9. The sound-absorbing material according to claim 1, wherein said monolithic main layer has a basis weight between 120 and 1000 g/m$^2$ and a total thickness along a direction Z between 10 and 40 mm.

10. The sound-absorbing material according to claim 3, wherein said first portion consists of
from 70% to 90% by weight of thermoplastic staple fibers having a count between 1.5 and 1.7 dtex; and
10% to 30% by weight of thermobonding fibers.

11. The sound-absorbing material according to claim 3, wherein said first portion consists of
from 40% to 80% by weight of thermoplastic staple fibers having a count between 1.5 and 1.7 dtex;
from 10% to 30% by weight of thermoplastic staple fibers having a count (linear density) between 2.2 and 3.3 dtex; and
10% to 30% by weight of thermobonding fibers.

12. The sound-absorbing material according to claim 3, wherein said second portion consists of
from 20% to 45% by weight of thermoplastic staple fibers having a count between 0.8 and 1.1 dtex;
from 25% to 70% by weight of thermoplastic staple fibers having a count between 1.5 and 1.7 dtex; and
10% to 30% by weight of thermobonding fibers.

13. The sound-absorbing material according to claim 3, wherein said thermoplastic staple fibers consist of a material selected from the group consisting of polyesters, polyamides, polyolefins, acrylics, aramidics, PPS, PBI, melamines, vinyls, viscose.

14. The sound-absorbing material according to claim 3, wherein said monolithic main layer comprises the multi-ply structures of the two portions overlapped in output by respective crosslappers and single thermobonded to consolidate the two multi-ply structures and to connect the two multi-ply structures to each other.

15. The sound-absorbing material according to claim 3, wherein said two multi-ply structures interpenetrate each other seamlessly at a transition zone between the two multi-ply structures.

16. The sound-absorbing material according to claim 3, wherein said monolithic main layer comprises an intermediate portion which:
is between said first portion and said second portion;
covers a remaining fraction of the thickness of said monolithic main layer;
consists of a mixture of fibers of the first portion and fibers of the second portion;
has a non-homogeneous density; and
has a part of the fibers oriented in the direction of the thickness.

17. The sound-absorbing material according to claim 16, wherein in said intermediate portion fibers of the first portion are interlaced with fibers of the second portion.

18. The sound-absorbing material according to claim 16, wherein said monolithic main layer comprises the multi-ply structures of the two portions overlapped in output by respective crosslappers and needled to create said intermediate portion, the needled multi-ply structures being thermobonded to simultaneously consolidate the two multi-ply structures and to connect the multi-ply structures to each other.

19. The sound-absorbing material according to claim 1, consisting of said monolithic main layer.

20. The sound-absorbing material according to claim 1, comprising at least one secondary layer in a material having a permeability to air which is less than permeability to air of the monolithic main layer and associated with said monolithic main layer at said first face or said second face, said secondary layer having a permeability to air less than 850 L/m$^2$s at a vacuum of 200 Pa, in use said sound-absorbing material being adapted to be oriented so that said secondary layer is first hit by the acoustic waves emitted by the source of noise.

21. The sound-absorbing material according to claim 20, wherein said at least one secondary layer consists of at least one layer of spunlace, meltblown, or spunbond type nonwoven fabric or by a multilayer of combinations thereof.

22. The sound-absorbing material according to claim 20, wherein said at least one secondary layer is associated with said monolithic main layer by a connection layer of thermoplastic or bonding material and/or by connection bridge structures defined by thermobonding fibers contained at least in the monolithic main layer.

23. A method for making a sound-absorbing material according to claim 1, said method comprising the following operating steps:
a) producing by a first carding machine and a first crosslapper a first multi-ply structure formed by a mixture of thermoplastic staple fibers and thermobonding staple fibers;
b) producing by a second carding machine and a second crosslapper a second multi-ply structure formed by a mixture of thermoplastic staple fibers and thermobonding staple fibers;
c) overlapping said first and said second multi-ply structures with each other, forming a multi-ply assembly;
d) thermally treating said multi-ply assembly to activate at least a part of the thermobonding fibers to consolidate the two multi-ply structures internally and simultaneously solidarize said two multi-ply structures to each other, obtaining a consolidated and solidarized multi-ply assembly,
wherein said consolidated and solidarized multi-ply assembly corresponds to said monolithic main layer, and wherein said first multi-ply structure corresponds to said first portion of said monolithic main layer and said second multi-ply structure corresponds to said second portion of said monolithic main layer.

24. The method according to claim 23, wherein said monolithic main layer comprises an intermediate portion which:
is between said first portion and said second portion;
covers a remaining fraction of the thickness of said monolithic main layer;
consists of a mixture of fibers of the first portion and fibers of the second portion;
has a non-homogeneous density; and
has a part of the fibers oriented in the direction of the thickness, the method further comprising the operating step e) of needling said multi-ply assembly before step d), so as to generate a portion in the transition zone between the two multi-ply structures which consists of fibers of the two multi-ply structures interlaced with each other and defines said intermediate portion.

25. The method according to claim 23, wherein said first multi-ply structure has a basis weight between 60 and 500 g/m² and a thickness along a direction Z between ⅔ and ¾ of a total thickness of the monolithic main layer and wherein said second multi-ply structure has a basis weight between 60 and 500 g/m² and a thickness along the direction Z between ⅓ and ¼ of the total thickness of the monolithic main layer, basis weight values and thickness values of the two multi-ply structures being chosen so that a density value corresponding to a ratio between a basis weight and the thickness of the first multi-ply structure is less than a ratio between a basis weight and the thickness of the second multi-ply structure.

26. Method according to claim 23, comprising the further operating steps of e) providing a secondary layer having a permeability to air which is less than a permeability to air of the monolithic main layer, said secondary layer having a permeability to air less than 850 L/m²s at a vacuum of 200 Pa, consisting of a spunlace fabric, nonwoven fabric, meltblown fabric, spunbond fabric, spun-melt fabric, SMS fabric; and f) associating said secondary layer to said monolithic main layer at said first face or said second face, by a connection layer of thermoplastic or bonding material and/or by connection bridge structures defined by thermobonding fibers contained at least in the monolithic main layer.

27. A method of using said sound-absorbing material according to claim 1, for absorbing acoustic waves emitted by a source of noise, wherein said material comprises said at least one secondary layer which is associated with said main monolithic layer at said first face or said second face, said method comprising orienting said sound-absorbing material so that the secondary support layer is hit first by the acoustic waves emitted by the source of noise.

28. The sound-absorbing material according to claim 1, comprising a porosity gradient in the direction of the thickness of the monolithic main layer increasing with the density gradient and an inverse trend relative to the fiber count gradient.

29. The sound-absorbing material according to claim 1, comprising a tortuosity gradient in the direction of the thickness of the monolithic main layer increasing with the density gradient and an inverse trend relative to the fiber count gradient.

30. A sound-absorbing material comprising:

a monolithic main layer made of non-woven fiber fabric, and having two opposite faces delimiting a thickness of said monolithic main layer, said monolithic main layer having a density gradient in a direction of the thickness;

wherein said monolithic main layer has a fiber count gradient in the direction of the thickness of the monolithic main layer which decreases, passing from a first face to a second face of said monolithic main layer, wherein the density gradient has an inverse trend relative to the fiber count gradient so that zones of lower fiber count correspond to zones of higher density;

a porosity gradient in the direction of the thickness of the monolithic main layer increasing with the density gradient and an inverse trend relative to the fiber count gradient;

a tortuosity gradient in the direction of the thickness of the monolithic main layer increasing with the density gradient and an inverse trend relative to the fiber count gradient.

31. The sound-absorbing material according to claim 30, wherein said monolithic main layer comprises:

a first portion defining the first face of said monolithic main layer and covering a first fraction of the thickness of said monolithic main layer, said first portion having a first predefined average density and containing fibers with a first predefined average count;

a second portion defining the second face of said monolithic main layer and covering a second fraction of the thickness of said monolithic main layer, said second portion having a greater second predefined average density than said first predefined average density and containing fibers with a second predefined average count less than said first predefined average count;

wherein the first portion of said monolithic main layer consists of a first multi-ply structure formed by a mixture of thermoplastic staple fibers and thermobonding staple fibers, wherein the second portion of said monolithic main layer consists of a second multi-ply structure formed by a mixture of thermoplastic staple fibers and thermobonding fibers;

wherein said two multi-ply structures interpenetrate each other seamlessly at a transition zone between the two multi-ply structures.

* * * * *